(12) United States Patent
Chatterjee

(10) Patent No.: US 7,130,876 B2
(45) Date of Patent: Oct. 31, 2006

(54) SYSTEMS AND METHODS FOR EFFICIENT QUANTIZATION

(75) Inventor: Chanchal Chatterjee, San Diego, CA (US)

(73) Assignee: General Instrument Corporation, Horsham, PA (US)

(*) Notice: Subject to any disclaimer, the term of this patent is extended or adjusted under 35 U.S.C. 154(b) by 605 days.

(21) Appl. No.: 10/010,674

(22) Filed: Nov. 30, 2001

(65) Prior Publication Data

US 2003/0105788 A1 Jun. 5, 2003

(51) Int. Cl.
*G06F 7/38* (2006.01)
(52) U.S. Cl. .................................... 708/550
(58) Field of Classification Search ............... 708/550, 708/551; 341/200; 375/240.03
See application file for complete search history.

(56) References Cited

U.S. PATENT DOCUMENTS

| | | | | |
|---|---|---|---|---|
| 5,329,475 A | * | 7/1994 | Juri et al. ............... | 708/551 |
| 5,590,064 A | * | 12/1996 | Astle ..................... | 375/240.14 |
| 5,748,793 A | * | 5/1998 | Sanpei ................... | 375/240.03 |
| 5,825,680 A | * | 10/1998 | Wheeler et al. ......... | 708/650 |
| 6,112,218 A | * | 8/2000 | Gandhi et al. .......... | 708/320 |
| 6,658,161 B1 | * | 12/2003 | Chen et al. ............. | 382/250 |
| 6,674,342 B1 | * | 1/2004 | Zennamo et al. ....... | 333/175 |
| 2003/0078953 A1 | * | 4/2003 | Hallapuro et al. | |

OTHER PUBLICATIONS

Andrew Watson, Perceptual optimzation of DCT color quantization matrices, Nov. 1994, IEEE Proceedings of the IEEE International Conference on Image Processing, pp. 1-5.*
"IA-32 Intel® Architecture Software Developer's Manual, vol. 1: Basic Architecture", Intel Corporation, P.O. Box 7641, Mt. Prospect IL 60056-7641, pp. iii to xii, 10-1 to 10-20, 11-1 to 11-36, (2002).
"IA-32 Intel® Architecture Software Developer's Manual, vol. 2: Instruction Set Reference", Intel Corporation, P.O. Box 7641, Mt. Prospect IL 60056-7641, pp. iii to xiii, 3-545 to 3-547, 3-578 to 3-580, 3-639 to 3-641, (2002).
"Information technology—Coding of moving pictures and associated audio for digital storage media at up to about 1,5 Mbit/s—Part 2: Video", ISO/IEC Copyright Office, Case Postale 56, CH1211 Genève 20, Switzerland, pp. ii, 1-17, 51-57, 77-105, (1993).
"VR5432 64-Bit MIPS® RISC Microprocessor", vol. 2, NEC Electronics Inc., U.S.A., pp. iii-xiii, 677-683, (2000).

* cited by examiner

*Primary Examiner*—Kakali Chaki
*Assistant Examiner*—Chat C. Do
(74) *Attorney, Agent, or Firm*—Thomas Bethea, Jr.

(57) ABSTRACT

A method in a signal processor for quantizing a digital signal is provided. A fixed-point approximation of a value $X \div Q$ is generated, wherein X is a fixed-point value based on one or more samples in the digital signal, and wherein Q is a fixed-point quantization parameter. A correction is generated, and the approximation is modified with the correction.

21 Claims, 22 Drawing Sheets

| 8  | 17 | 18 | 19 | 21 | 23 | 25 | 27 |
|----|----|----|----|----|----|----|----|
| 17 | 18 | 19 | 21 | 23 | 25 | 27 | 28 |
| 20 | 21 | 22 | 23 | 24 | 26 | 28 | 30 |
| 21 | 22 | 23 | 24 | 26 | 28 | 30 | 32 |
| 22 | 23 | 24 | 26 | 28 | 30 | 32 | 35 |
| 23 | 24 | 26 | 28 | 30 | 32 | 35 | 38 |
| 25 | 26 | 28 | 30 | 32 | 35 | 38 | 41 |
| 27 | 28 | 30 | 32 | 35 | 38 | 41 | 45 |

| 16 | 17 | 18 | 19 | 20 | 21 | 22 | 23 |
|----|----|----|----|----|----|----|----|
| 17 | 18 | 19 | 20 | 21 | 22 | 23 | 24 |
| 18 | 19 | 20 | 21 | 22 | 23 | 24 | 25 |
| 19 | 20 | 21 | 22 | 23 | 24 | 26 | 27 |
| 20 | 21 | 22 | 23 | 25 | 26 | 27 | 28 |
| 21 | 22 | 23 | 24 | 26 | 27 | 28 | 30 |
| 22 | 23 | 24 | 26 | 27 | 28 | 30 | 31 |
| 23 | 24 | 25 | 27 | 28 | 30 | 31 | 33 |

SYSTEMS AND METHODS FOR EFFICIENT QUANTIZATION

BACKGROUND OF THE INVENTION

The present invention relates generally to techniques for performing integer arithmetic, and, more particularly, for performing quantization and prediction calculations in video encoders and decoders.

In video communication (e.g., television, video conferencing, streaming media, etc.), a stream of video frames are transmitted over a transmission channel to a receiver. Depending on the particular application, audio information associated with the video may also be transmitted. Video data is generally voluminous. For example, typical television images have spatial resolution of approximately 720× 480 pixels per frame. If 8 bits are used to digitally represent a pixel, and if the video is to be transmitted at 30 frames per second, then a data rate of approximately 83 Mbits per second would be required. However, the bandwidth of transmission channels are typically limited. Thus, the transmission of raw digital video data in real-time is generally not feasible. Similarly, the storage of raw digital video data is prohibitive because the amount of memory for storage is typically limited.

Consequently, video data is generally compressed prior to transmission and/or storage. Various standards for video compression have emerged, including H.261, MPEG-1, MPEG-2, MPEG-4, H.263, and the like. Compression techniques generally exploit the redundancy of information, both within each picture of a stream of video and between pictures in the stream. For example, one commonly used technique for compressing video data involves performing a mathematical transform (e.g., discrete cosine transform) on the picture data, which transforms the picture data into the 2-dimensional spatial frequency domain. Then, the transformed picture data is quantized (i.e., the resolution of the data is reduced so that less bits are required to represent the data), taking advantage of the fact that human sight is generally less sensitive to higher spatial frequencies (i.e., transformed picture data corresponding to higher spatial frequencies are more severely quantized than transformed video data corresponding to lower spatial frequencies). At the receiver, the inverse transform is applied to the received video data to regenerate the video.

In another common technique, rather than transmitting a new picture in the video stream, the difference between the new picture and a previous picture is transmitted. Because successive pictures in a video stream are often similar, the difference information can be transmitted using much less bits than would be required to transmit the picture itself.

The number of bits required to transmit video can be further reduced using prediction techniques at the encoder and decoder. For instance, the encoder can "predict" a current picture in the video stream based on a previous picture, and then calculate the error between its prediction and the actual picture. The error between a predicted picture and the actual picture will tend to be smaller than the error between the actual picture and a previous picture. Because the error is smaller, less bits are needed to represent the error, thus, reducing the amount bits that need be transmitted. At the receiver, a decoder generates a predicted picture and combines it with the received error information to generate the actual picture.

One technique for generating a prediction of a picture in a video stream involves motion estimation. In one motion estimation technique, a current picture is partitioned into 8-by-8 blocks of pixels. For each block, a best fit to the block is searched for within a reference picture, such as, for example, another actual or predicted picture in the video stream that is adjacent to the current picture. Once a best fit is found, a motion vector is determined that basically indicates where in the reference picture the best fit block is located. Then, the motion vector and errors for each block of the frame are transmitted to the receiver. At the receiver, the current picture is reconstructed using the reference picture, the motion vectors and the error information.

Techniques similar to those described above, as well as other techniques, can be combined to achieve greater degrees of compression without reducing video quality beyond a desired level. For example, in the MPEG-1, MPEG-2, and MPEG-4 standards, pictures in the video stream are predicted, and the difference between the actual picture and the predicted picture are calculated. Then, the discrete cosine transform (DCT) of the difference is calculated, and the DCT coefficients are quantized.

In typical video systems, video data are represented and processed as fixed-point numbers. What is needed are more efficient techniques for processing fixed-point data.

BRIEF SUMMARY OF THE INVENTION

According to one embodiment of the invention, a method in a signal processor for quantizing a digital signal is provided. The method comprises generating a fixed-point approximation of a value $X \div Q$, wherein X is a fixed-point value based on one or more samples in the digital signal, and wherein Q is a fixed-point quantization parameter. The method also comprises generating a correction, and modifying the approximation with the correction.

According to another embodiment, a computer program product is provided. The computer program product comprises a computer readable storage medium having computer program code embodied therein for quantizing a digital signal. The computer program code includes code for generating a fixed-point approximation of a value $X \div Q$, wherein X is a fixed-point value based on one or more samples in the digital signal, and wherein Q is a fixed-point quantization parameter. The computer program additionally includes code for generating a correction, and code modifying the approximation with the correction.

According to yet another embodiment, a system for quantizing a digital signal is provided. The system includes a memory that stores a fixed point value X based on one or more samples in the digital signal, and a processor coupled to the memory. The processor is operable to perform the steps of A) generating a fixed-point approximation of a value $X \div Q$, wherein Q is a fixed-point quantization parameter, B) generating a correction, and C) modifying the approximation with the correction.

According to still another embodiment, a method in a signal processor for quantizing a digital signal is provided. The method comprises generating a fixed-point approximation X1 of a value $X \div W$, wherein X is a fixed-point value based on one or more samples in the digital signal, and wherein W is a first fixed-point quantization parameter. The method also comprises generating a first correction, and modifying X1 with the correction to produce a fixed-point value X2. The method additionally comprises generating a fixed point approximation X3 of a value $X2 \div (2*Q)$, wherein Q is a second fixed-point quantization parameter. The method further comprises generating a second correction, and modifying X3 with the correction.

Numerous benefits are achieved by way of the present invention. For example, in a specific embodiment, quantization is performed more accurately than with conventional approximation techniques. Further, this specific embodiment is less computationally expensive as compared to conventional accurate techniques.

Other features and advantages of the invention will be apparent from the following detailed description and appended drawings.

DETAILED DESCRIPTION OF SPECIFIC EMBODIMENTS

Explanation of Terms

Figure 1:
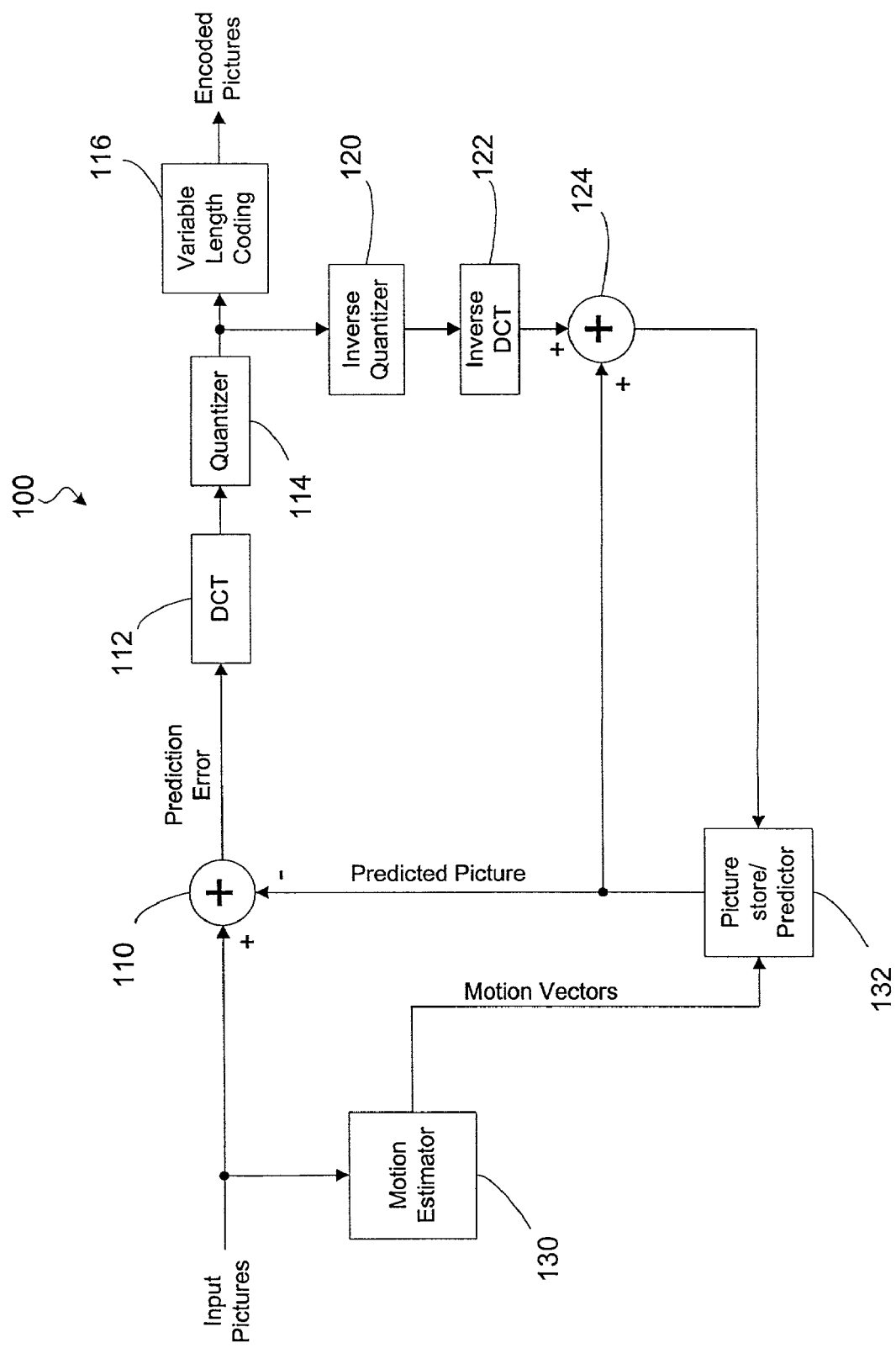
FIG. 1 is a simplified data flow diagram of an example of a video encoder.

An explanation of the meaning and scope of various terms used in this description is provided below.

A series of related pictures is typically referred to as "video". The term "picture" as used herein refers to a field of non-interlaced video, a frame of interlaced video, a field of interlaced video, etc.

Each picture in a video comprises an array of pixels, and each pixel can be represented as one or more numbers. For example, a pixel can be represented as a luminance value, and two chrominance values, or, represented as only a luminance value. As used hereinafter, the term "pixel" refers to a luminance value, a chrominance value, or a luminance value and one or more chrominance values.

In typical video systems, pixels are represented as n-bit integers. As used herein, the number of bits used to represent a value will be referred to as a "word length". Usually, word lengths are a power of two, but need not be. Thus, as used herein, an "n-bit integer" refers to an integer represented using n-bits.

In MPEG encoding and decoding systems, pixels are often processed in 8-by-8 groups of pixels referred to as "blocks". It is to be understood, however, that a "block" of pixels need not be limited to only 8-by-8 groups. For instance, a block could be a 16-by-8 group, a 16-by-16 group, or of any dimensions suitable for a particular implementation, and need not be square. As used herein, a "block" can refer to a group of pixels or a group of values based on a block of pixels. For example, a group of DCT coefficients generated from a block of pixels may also be referred to as a "block".

In image processing or video processing systems, pixels are mathematically manipulated. For example, pixels may be involved in addition/subtraction operations, multiplication operations, and division operations. As described above, pixels are often represented as integers, and thus are involved in integer mathematical operations. For example, an integer division involves the division of an integer dividend by an integer divisor to produce an integer quotient.

An integer division often generates a different quotient as compared to a floating-point division. For instance, the floating-point division of 5 by 2 produces the value 2.5, whereas an integer division of 5 by 2 produces the value 2 (rounded towards 0) or 3 (rounded to the nearest integer).

As used herein, the symbol "÷" shall be used to refer to a floating-point division, and the symbol "/" will be used to refer to an integer division in which the quotient is rounded towards zero (e.g., 5÷2=2.5; 5/2=2). Also, the symbol "%" will be used to refer to the remainder of an integer division rounded towards zero. For example, the remainder of an integer division of 5 by 2, rounded towards zero, is 1 (i.e., 5% 2=1). Further, the symbol "//" will be used to refer to an integer division in which the quotient is rounded towards the nearest integer, with half values being rounded away from zero unless otherwise specified (e.g., 5//2=3).

As described above, one method of encoding video data involves "quantizing" the data so that less bits are required to transmit the data. One simple method for quantizing data is to divide by an integer constant using integer division. For instance, if all pixels in a video are divided by 2, then one less bit per pixel is required to transmit the video. As an example, three bits are required to represent the value 5 (101 binary), but if 5 is divided by 2 using fixed-point division, then only two bits are required (e.g., 10 binary, or 11 binary). At the receiver, the pixels can then be multiplied by two. Thus, if the original value of a pixel were 5, the restored value at the receiver would be 4 or 6, depending on the type of rounding used. As can be seen, the number of bits required to be transmitted is reduced, but at the expense of the resolution of the data.

System Overview

FIG. 1 is a simplified data flow diagram of an example of a video encoder 100 in which some embodiments of the present invention may be utilized. Video encoder 100 receives video data to be encoded and generates encoded video. The video to be encoded comprises a series of pictures, and video encoder 100 generates a series of encoded pictures. Each input picture comprises an array of pixels, and each pixel is typically represented as an unsigned integer, typically using eight or sixteen bits. Each input picture is provided to a subtractor 110 that subtracts from the input picture a predicted picture to produce a prediction error. Predicted pictures are generated by a predictor 132.

As is well known to those skilled in the art, not all pictures in a video stream need be encoded using prediction. Thus, for some pictures, predictor 132 does not generate a predicted picture. Pictures encoded without prediction will hereinafter be referred to as "Intra" pictures, and pictures encoded with prediction will hereinafter be referred to as "Non-Intra" pictures. Therefore, for Intra pictures, the prediction error is merely the input picture.

The prediction error is then provided to a discrete cosine transform (DCT) calculator 112 that generates the DCT coefficients of the prediction error. The DCT coefficients are provided to a quantizer 114 that quantizes the DCT coefficients. With typical video information, many of the quantized DCT coefficients generated by quantizer 114 are often zero. The quantized DCT coefficients are provided to a variable length coder 116 that encodes the quantized DCT coefficients using, for example, a Huffman code or the like, to produce an encoded picture.

The quantized DCT coefficients generated by quantizer 114 are also provided to an inverse quantizer 120, and the output of the inverse quantizer is provided to an inverse DCT calculator 122. Inverse DCT calculator 122 generates a decoded prediction error that is provided to an adder 124. Adder 124 adds the decoded prediction error with a corresponding predicted picture to generate a decoded picture. The input pictures are also provided to a motion estimator 130 that generates motion vectors which are provided to predictor 132. Predictor 132 generates predicted pictures based on the motion vectors and decoded pictures.

Figure 2:
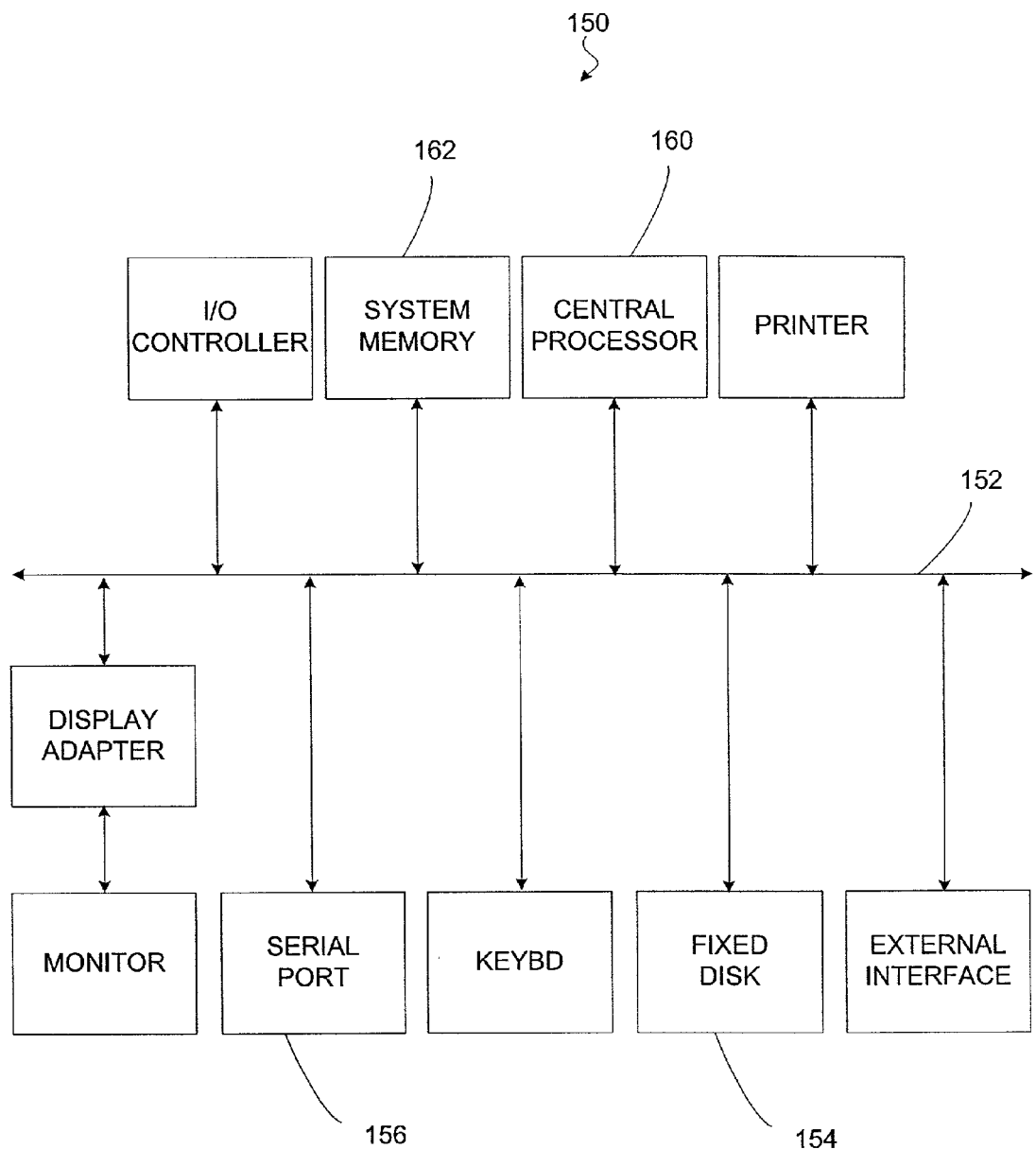
FIG. 2 is a simplified block diagram illustrating basic subsystems in a representative computer system in which methods according to various embodiments of the invention can be implemented.

A video encoder, such as, for example, encoder 100 illustrated in FIG. 1, can be implemented in hardware, software, or in a combination of hardware and software. FIG. 2 is a simplified block diagram of a representative computer system 150 on which software can be executed that implements some or all of the encoder elements illustrated in FIG. 1. This diagram is merely an illustration and should not limit the scope of the claims herein. One of ordinary skill in the art will recognize other variations, modifications, and alternatives.

In certain embodiments, the subsystems are interconnected via a system bus 152. Additional subsystems such as a printer, keyboard, fixed disk 154 and others are shown. Peripherals and input/output (I/O) devices can be connected to the computer system by any number of means known in the art, such as serial port 156. For example, serial port 156 can be used to connect the computer system to a modem, which in turn connects to a wide area network (e.g., the Internet), an internet, an intranet, an extranet. As another example, serial port 156 can be used to connect the computer system to a satellite communications link, a terrestrial broadcast link, a cable communications link, etc. The interconnection via system bus 152 allows central processor 160 to communicate with each subsystem and to control the execution of instructions from system memory 162 or the fixed disk 154, as well as the exchange of information between subsystems. Many other devices or subsystems (not shown) can be coupled to bus 152. Also, it is not necessary for all the devices or subsystems shown in FIG. 2 to be present to practice the present invention. Other arrangements of subsystems and interconnections are readily achievable by those of ordinary skill in the art.

System memory 162, and the fixed disk 154 are examples of tangible media for storage of computer programs. Other types of tangible media include floppy disks, removable hard disks, optical storage media such as CD-ROMS and bar codes, and semiconductor memories such as flash memory, read-only-memories (ROM), and battery backed memory.

Central processor 160 may be any processor suitable for handling the throughput required for a particular video encoding implementation. For example, the central processor 160 can be a single instruction multiple data (SIMD) processor such as, for example, an Intel™ processor with MMX™ technology, an NEC VR5234 processor, an Equator MAP-CA™ processor, a Philips TM-1300 processor, etc. Additionally, it is to be understood that multiple processors can be used as well.

Systems such as that illustrated in FIG. 2 can be used to encode data, for example, according to an MPEG standard. In such embodiments, data to be encoded can be, for example, stored on fixed disk 154, stored on CD-ROM (not shown), received via serial port 156, etc. After encoding, the encoded data can be, for example, stored on fixed disk 154, stored on CD-ROM (not shown), transmitted over a network via serial port 156, etc. Also, computer code for encoding data can be, for example, stored on fixed disk 154, etc.

Similarly, systems such as that illustrated in FIG. 2 can be used to decode data that was encoded, for example, according to an MPEG standard. In such embodiments, data to be decoded can be, for example, stored on fixed disk 154, stored on CD-ROM (not shown), received via serial port 156, etc. After decoding, the decoded data can be, for example, displayed on a monitor using display adaptor. Also, computer code for decoding data can be, for example, stored on fixed disk 154, etc.

Computer systems that can be used to implement embodiments of methods according to the present invention include, but are not limited to, personal computers, set-top boxes, personal digital assistants, workstations, servers, server systems, mainframes, etc. Additionally, embodiments of methods according to the present invention can be implemented using distributed computer systems.

Quantization

As described above, quantizers, such as quantizer 114 of FIG. 1, quantize a value so that less bits are required to represent the value. Thus, in combination with, for example, entropy coding, run length coding, or the like, a series of quantized values can be compressed into a smaller number of bits for storage and/or transmission.

In typical MPEG encoders, DCT processing is performed on a block of pixels (e.g., an 8-by-8 block). For instance, a DCT calculator, such as, for example, DCT calculator 112 of FIG. 1, generates a block of DCT coefficients from a block of pixels, a block of prediction errors, etc. Then, the DCT coefficients in the block are quantized. The degree of quantization of a particular DCT coefficient in a block is controlled by two values. First, a quantization matrix W specifies a quantization step for each individual DCT coefficient in the block, where each element W[i] corresponds to a particular DCT coefficient in the block. If the block of DCT coefficients is an 8-by-8 block, then $1 \leq i \leq 64$. Also, a quantization scale Q specifies a degree of quantization over the block as a whole. Thus, the degree of quantization of a particular DCT coefficient can be adjusted by adjusting the value W[i], and the degree of quantization of the block as a whole can be adjusted by adjusting the value Q.

Figures 3A, 3B, 3C:
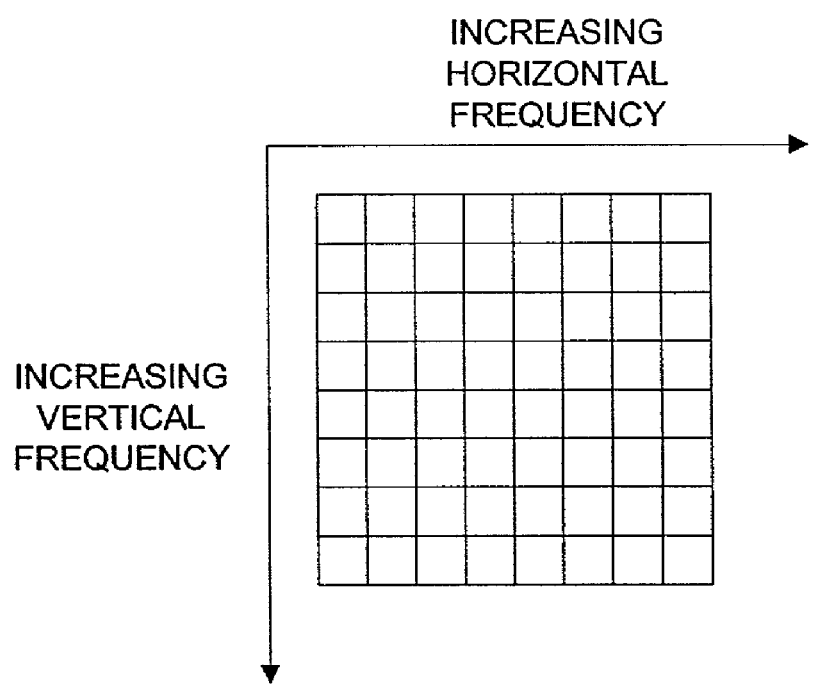
FIGS. 3A and 3B are examples of quantization matrices used in MPEG systems.
FIG. 3C illustrates how the quantization matrices of FIGS. 3A and 3B corresponds to discrete cosine transform (DCT) coefficients.

According to MPEG standards, each value in the quantization matrix W is an eight bit integer. FIG. 3A illustrates an example quantization matrix for quantizing a block of an Intra picture. FIG. 3B illustrates an example quantization matrix for quantizing a block of a Non-Intra picture. FIG. 3C illustrates how the quantization matrices of FIGS. 3A and 3B correspond to DCT coefficients of a block.

Figure 4A:
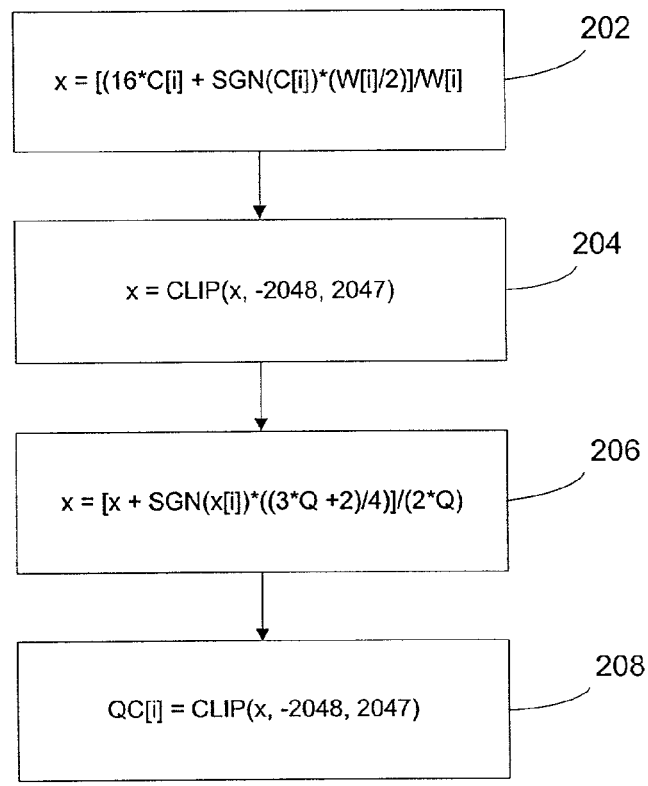
FIGS. 4A and 4B are simplified flow diagrams illustrating methods for quantizing DCT coefficients according to the MPEG-4 standard.
Figure 4B:
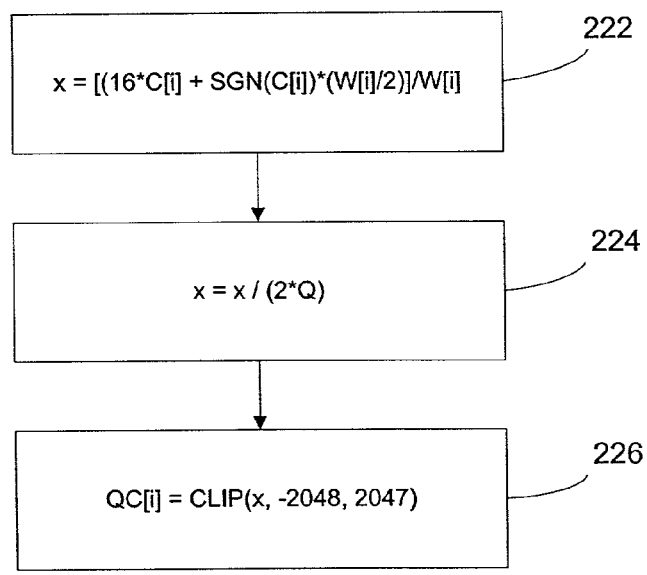

As described above, quantization can be as simple as dividing values by some constant. However, quantization can also involve more complicated calculations. FIGS. 4A and 4B illustrate one particular implementation of quantization in an MPEG-4 encoder. Particularly, FIG. 4A is a simplified flow diagram illustrating a method for quantizing DCT coefficients for an Intra picture, and FIG. 4B is a simplified flow diagram illustrating a method for quantizing DCT coefficients for a non-Intra picture. In FIGS. 4A and 4B, C[i] is the i-th unquantized DCT coefficient of a block, QC[i] is the i-th quantized DCT coefficient, x is an intermediate value, W[i] is the i-th element in the quantization matrix, Q is the quantization scale, the operator CLIP(x, -2048, 2047) clips the integer x between the values -2048 to 2047 (i.e., if x<-2048, then x=-2048 and if x>2047, then x=2047), and the operator SGN(x) is 1 if $x \leq 0$ and -1 if x<0. Typically, elements in the quantization matrix are positive numbers between 1 and 256, inclusive, and the quantization scale Q is a positive number in the range of 1 to 31, inclusive.

Regarding Intra quantization, in step 202, an intermediate value x is generated from the unquantized DCT coefficient C[i] according to the equation shown. Then, in step 204, the value x generated in step 202 is clipped between the values -2048 and +2047. Next, in step 206, the clipped value x is modified according to the equation shown. Finally, in step 208, the quantized coefficient QC[i] is generated by clipping the value x generated in step 206.

Regarding Non-Intra quantization, in step 222, an intermediate value x is generated from the unquantized DCT coefficient C[i] according to the same equation described with respect to step 202 of FIG. 4A. Then, in step 224, the value x is divided by the value 2*Q. Finally, in step 226, the quantized coefficient QC[i] is generated by clipping the value x generated in step 224.

As can be seen in FIGS. 4A and 4B, quantizing DCT coefficients includes performing one or more integer division operations. As is well known to those skilled in the art, directly computing an integer division operation is computationally expensive. Thus, in some implementations of MPEG encoders and decoders, an approximate solution to an integer division operation that is relatively computationally inexpensive is computed.

Approximate Integer Division

Figure 5:
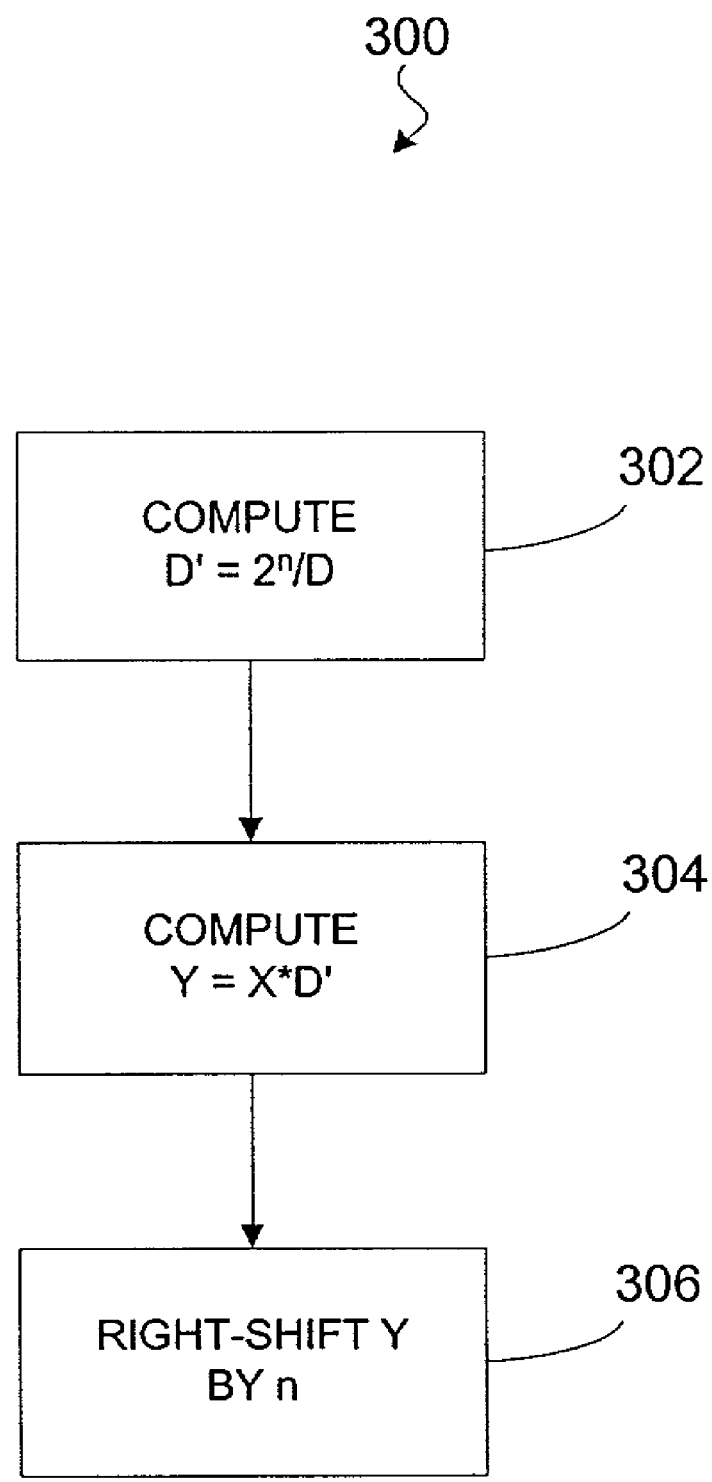
FIG. 5 is a simplified flow diagram illustrating one technique for generating an approximation of an integer division.

FIG. 5 is a simplified flow diagram of one embodiment of a method for computing an approximation of an integer division of an unsigned integer dividend X by an unsigned integer divisor D. This method is useful for applications, such as MPEG encoders and decoders, in which a divisor is known ahead of time (e.g., a constant), a divisor is known to be one of a relatively small number of possible divisors, in which a same divisor is used in many division operations, etc. For example, this method can be used for quantizing DCT coefficients using quantization step values and/or quantization scales.

In this specific embodiment, integers X and D have the same word length n. In step 302, an integer D' of word length n is computed as $2^n$ divided by the D, rounded towards zero. The value D' can, for example, be precomputed, computed when first needed, etc., using traditional techniques, and then stored for future use. In some embodiments, values of D' corresponding to various values of D can be precomputed and stored in a look-up table. Thus, when a divide by D operation is required, an appropriate value D' can be obtained from the look-up table. It is to be understood that the value D' can be computed using a number of methods. For example, D' can be computed using an integer division operation in (e.g., $D'=2^n/D$), or using a floating-point operation and then converting the result to an integer representation (e.g., $D'=2^n \div D$, rounded towards zero).

Then, in step 304, the value to be divided, X, is multiplied by D'. The result, Y, of step 304 is typically a 2n-bit approximation of the desired result (i.e., X//D), but left-shifted by n. Thus, in step 306, the value Y is right-shifted by n to produce the desired result (i.e., an approximation of X//D). It is to be understood that in step 306, the value Y need not be explicitly right-shifted. For example, in some embodiments, the desired result may be obtained by truncating the 2n-bit integer Y to remove the n least-significant bits. Also, in some embodiments, because the lower n-bits will be discarded, they need not be computed at all. For instance, Intel™ microprocessors with MMX™ technology provide an instruction PMULHUW that multiplies two 16-bit integers, and generates only the upper 16-bits of the 32-bit product.

The embodiments described with respect to FIG. 5 provide an approximate method for computing integer division that merely involves (1) retrieving a value D', for example, from a look-up table; (2) a multiplication; and, (3) a truncation or bit-shift operation. Also, as described above, in some embodiments, a truncation or bit-shift is not required because a multiplication can be performed that generates only the bits needed. In contrast, traditional techniques for computing an integer division require numerous steps, or require execution of a division instruction of a microprocessor that takes numerous clock cycles to execute.

One skilled in the art will recognize many modifications, alternatives, and equivalents to the embodiments described with respect to FIG. 5. For example, the integers X, D and D' need not be of the same word length.

The embodiments described with respect to FIG. 5 provide an approximate result of an integer division. Particularly, the approximate result can, in some instances, differ from the desired result by 1.

Accurate Integer Division

Figure 6:
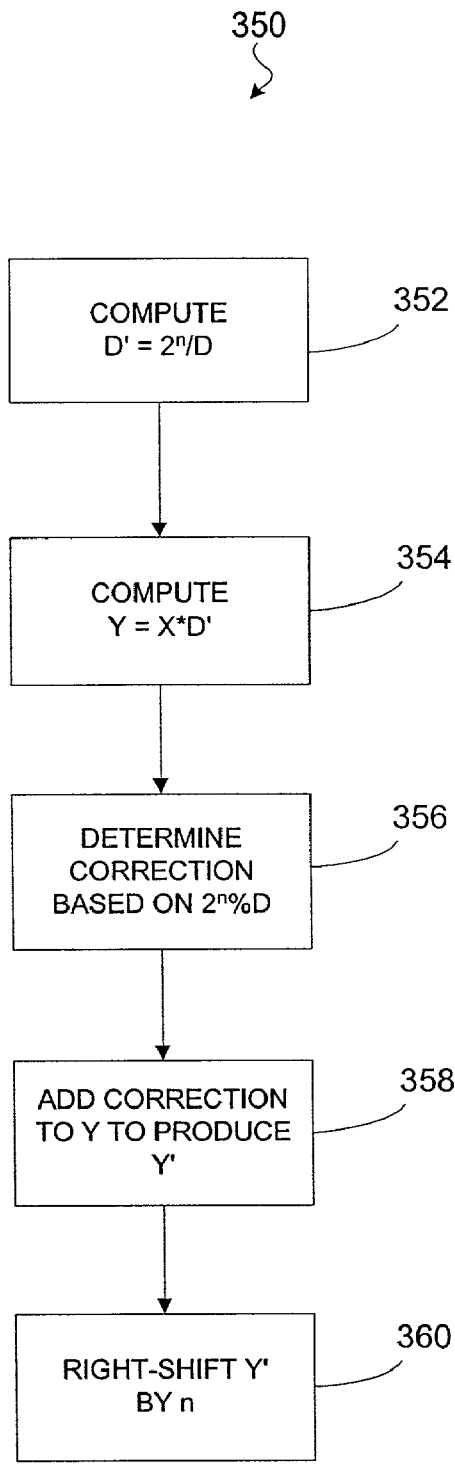
FIG. 6 is a simplified flow diagram illustrating a method for performing an accurate integer division according to one embodiment of the present invention.

FIG. 6 is a simplified flow diagram of another embodiment of a method for computing an integer division of an unsigned integer X by an unsigned integer D. It has been determined that this embodiment provides accurate results for certain ranges of X and D. Particularly, it has been determined experimentally that this embodiment provides the result X//D when X is within the range [−2048, +2047], and when D is within the range [1,57]. Accurate results may be provided over other ranges as well, and such other ranges may be determined experimentally.

Steps 352 and 354 are similar to steps 302 and 304, respectively, in FIG. 5. Particularly, in step 352, an integer D' of word length n is computed as $2^n$ divided by a divisor D, rounded towards zero. It is to be understood that integer D' can be computed using a variety of techniques. Then, in step 354, the dividend, X, is multiplied by D'. The result, Y, of step 304 is an approximation of the desired result (i.e., X//D), but left-shifted by n. In step 356, a correction is determined based on the remainder of $2^n$ divided by D. Determining the correction based on $2^m \% D$ is described in more detail subsequently.

Then, in step 358 the correction determined in step 356 is added to the value Y determined in step 354 to produce a value Y'. The result, Y', of step 358 is the desired result, i.e., X//D (if X and D are within appropriate ranges), but left-shifted by n. Next, in step 360, the value Y' is right-shifted by n to produce the desired result. Step 360 may be implemented similarly to step 306 of FIG. 5.

Generating Correction

Figure 7A:
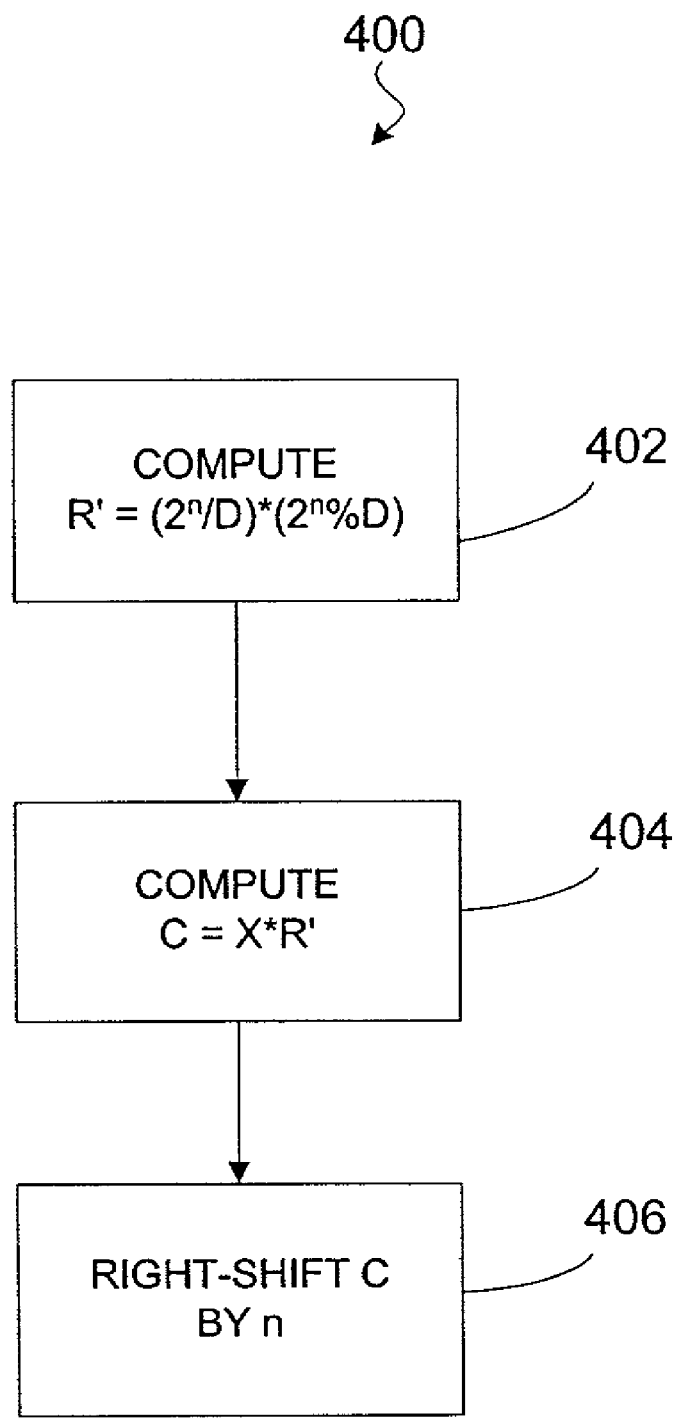
FIGS. 7A and 7B are simplified flow diagrams illustrating methods for generating correction values used in the method of FIG. 6 according to the present invention.

FIG. 7A is a simplified flow diagram of one embodiment of a method for determining a correction as in step 356 of FIG. 6. In step 402, an integer R' of word length n is computed according to the equation:

$$R'=(2^n/D)*(2^n\%D). \quad (1)$$

The value R' can, for example, be precomputed, computed when first needed, etc., using various techniques (e.g., integer division, floating point and then rounding, etc.), and then stored for future use. In some embodiments, values of R' corresponding to various values of D can be precomputed and stored in a look-up table. Thus, when a divide by D operation is required, an appropriate value R' can be obtained from the look-up table.

Then, in step 404, the dividend, X, is multiplied by R'. The result, C, of step 404 is a correction, but left-shifted by n. Thus, in step 406, the value C is right-shifted by n to produce the correction. It to be understood that in step 406, the correction C need not be explicitly right-shifted. For example, in some embodiments, the correction may be obtained by truncating C to remove the n least-significant bits, or using an instruction (e.g., the PMULHUW instruction of Intel™ microprocessors with MMX™ technology) to generate only the n most-significant bits of X multiplied with R'.

Figure 7B:
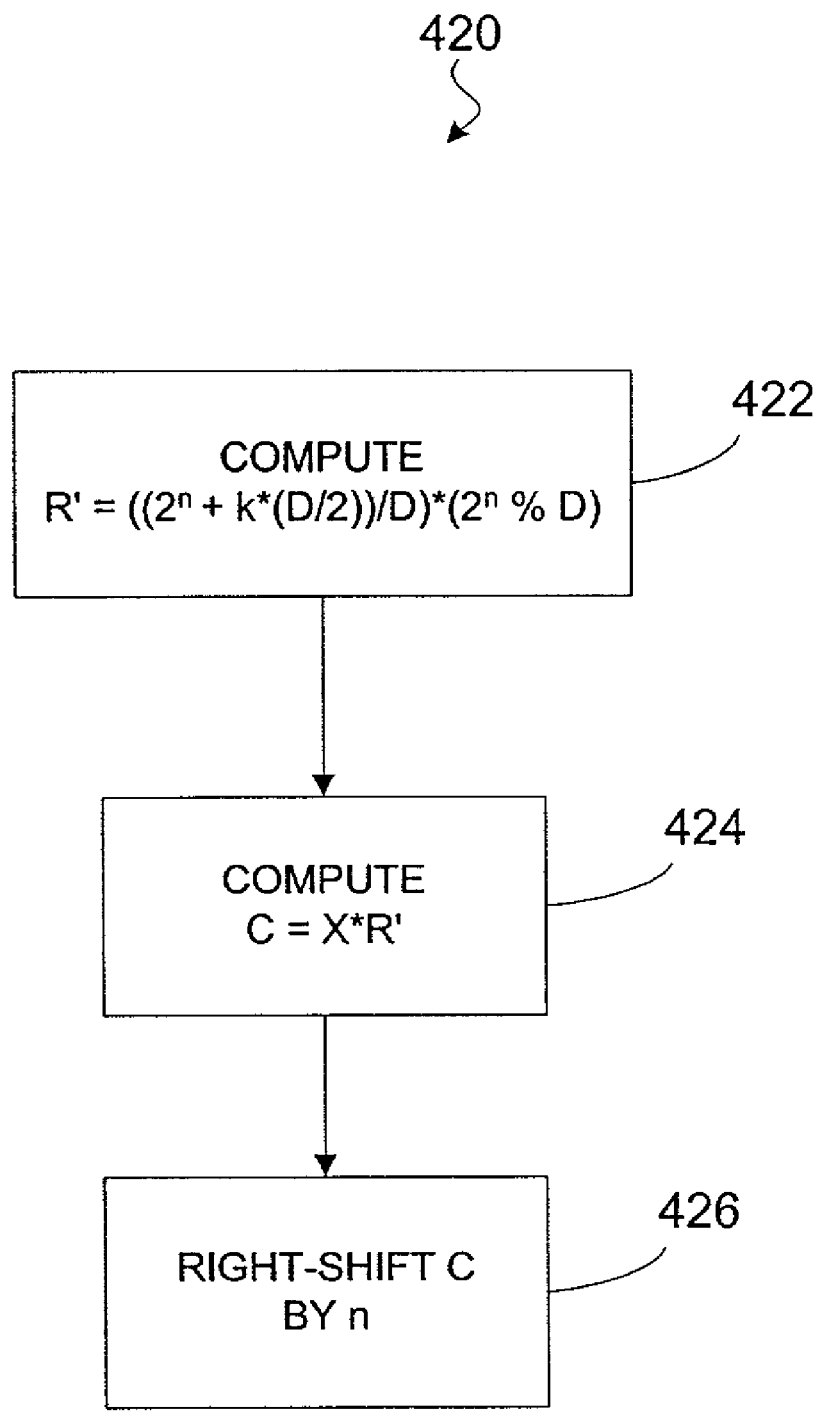

FIG. 7B is a simplified flow diagram of another embodiment of a method for determining a correction as in step 356 of FIG. 6. The method is similar to that illustrated in FIG. 7A. However, in step 422, integer R' of word length n is computed according to the equation:

$$R'=((2^n+k*(D/2))/D)*(2^n\%D) \quad (2)$$

where k is a number (typically an integer, but need not be) greater than or equal to zero that can be selected for the particular implementation. For instance, it has been determined that when k is one, the ranges of X and D over which an accurate result is produced are larger than when k=0. Particularly, it has been determined that accurate results are produced when X is within the range [−2048, +2047] and when D is within the range [1, 174]. Additionally, it has been determined that when k is two, the ranges of X and D over which an accurate result is produced is further increased. Particularly, it has been determined that accurate results are produced when X is within the range [−2048, +2047] and when D is within the range [1, 32766]. Note that when k is zero, equation (2) is the same as equation (1). The above embodiments may be accurate over other ranges of X and D as well, and such other ranges may be determined experimentally.

Note that, as in the previous embodiments, R' can be computed using various methods (e.g., integer division, floating point calculations and then rounding, etc.).

Implementation Using an Intel™ Microprocessor With MMX™ Technology

Figure 8:
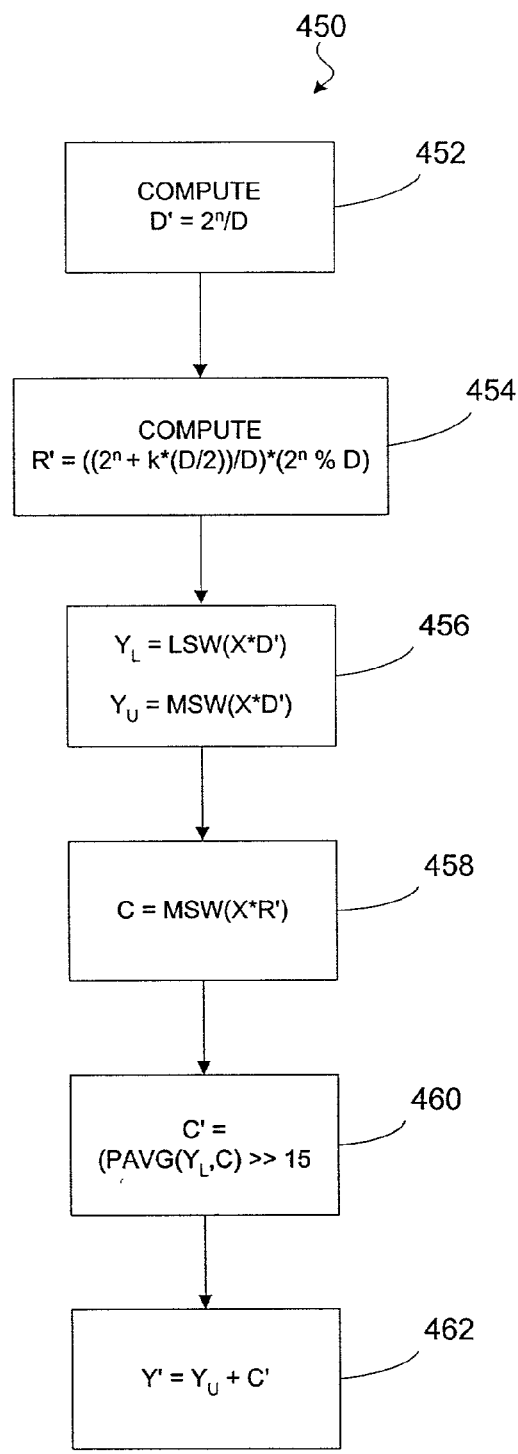
FIG. 8 is a simplified flow diagram illustrating a method for performing a an accurate integer division according to another embodiment of the present invention.

FIG. 8 is a simplified flow diagram illustrating one specific embodiment of a method for computing an approximation of respective integer divisions of a plurality of unsigned integers $x_1$ by a plurality of unsigned integers $d_i$, respectively (i.e., $x_i//d_i$). Particularly, this specific embodiment may be implemented using, for example, an Intel™ processor with MMX™ technology, or the like. In this specific embodiment, X represents a register or memory location that includes a plurality of packed integers $x_1$, and D represents a register or memory location that includes a plurality of packed integers $d_i$. In this specific embodiment, each of the integers $x_1$ and $d_i$ each have a word length of 16 bits. Thus, X and D can each include, for example, four packed integers in a 64-bit memory space or register (i.e., i=1, 2, 3, 4). Similarly, X and D can each include, for example, eight packed integers in a 128-bit memory space or register (i.e., i=1, 2, . . . , 8). It is to be understood, however, that in other embodiments other word lengths (e.g., 8, 32, etc.) may be used.

In steps 452 and 454, the values D' and R' are computed. D' represents a plurality of packed 16-bit integers $d'_i$, and R' represents a plurality of packed 16-bit integers $r'_i$. The number of packed integers included in D' and R' corresponds to the numbers of packed integers in X and D. Each of the values $d'_i$ and $r'_i$ are computed based on respective values of $d_i$. Each of the values $d'_1$, can be computed, for example, as described above with respect to step 352 of FIG. 6. Each of the values $r'_i$ can be computed, for example, as described above with respect to step 402 of FIG. 7A or step 422 of FIG. 7B.

In step 456, the packed integers included in X and D' are multiplied together to produce respective products, and the least significant word (LSW) of each of the products is packed together with the other product LSWs in $Y_L$. Similarly, the most significant word (MSW) of each of the products is packed together with the other product MSWs in $Y_U$. It is to be understood that the multiplication of X and D' and the packing of LSWs and MSWs need not be explicit, separate steps. For example, the PMULHUW operation of Intel™ microprocessors with MMX™ technology is a packed multiply instruction that multiplies packed, 16-bit, unsigned integers, and generates a packed, 16-bit integer result, where each packed, 16-bit integer result is the upper 16-bits of the corresponding 32-bit product. Similarly, the PMULLW instruction generates packed, 16-bit integers that correspond to the lower 16-bits of a corresponding 32-bit product.

In step 458, the packed integers of X are multiplied with the packed integers of R', and the MSW of each of the products is packed together with the other product MSWs in C. Step 460 is similar to steps 404 and 406 of FIG. 7A. Particularly, the packed integers in C are the same as the result of multiplying the packed integers of X with those in R', and then right shifting the results by the word length, 16. Then, in step 460, packed integers C' are determined using the PAVGW function operation of an Intel™ microprocessors with MMX™ technology. Particularly, the integers C' are determined as the result of PAVGW($Y_L$, C), right-shifted by 15 (indicated as ">>15" in FIG. 8). The PAVGW operation on packed integers $Y_L$ and C generates the result ($Y_L$+C+1) right-shifted by 1. The intermediate sum ($Y_L$+C+1) is computed as a 17-bit number to avoid overflow errors. Thus, the packed integers C' generated in step 462 are ($Y_L$+C+1) right-shifted by 16.

Then, in step 462, the desired results, packed in Y', are calculated as the addition of $Y_U$ and C'. The integers C' generated in step 462 will each typically be either one or zero. Thus, in step 464, each integer comprising Y' is typically the corresponding integer in $Y_U$, or the corresponding integer in $Y_U$ plus one.

The specific embodiment described with respect to FIG. 8 is similar to the embodiments described with respect to FIGS. 4, 7A and 7B. For instance, steps 454 and 460 generate packed correction values C similar to the single integer C generated in steps 402, 404 and 406 of FIG. 7A and steps 422, 424 and 426 of FIG. 7B. Additionally, these packed integers C of FIG. 8 are, in effect, added to the corresponding 32-bit wide integers $Y_U$:$Y_L$ in steps 460 and 462, similar to step 358 of FIG. 6. The use of the PAVGW operation in step 462, however, adds, in effect, a one to the each of the correction values C generated in step 458. Thus, in effect, the correction values C generated in the specific embodiment described with respect to FIG. 6 are similar to, but different than, the correction value C generated in the specific embodiments described with respect to FIGS. 7A and 7B.

Quantization According to MPEG-4

The above embodiments are useful in performing quantization according to various MPEG video encoding/decoding standards. For example, as described previously, FIGS. 4A and 4B illustrate pseudo code steps for quantizing a block of DCT coefficients according to one typical MPEG-4 implementation. In particular, FIG. 4A illustrates pseudo code steps for quantizing DCT coefficients for an Intra picture, and FIG. 4B illustrates pseudo code steps for quantizing DCT coefficients for a Non-Intra picture.

Figure 9A:
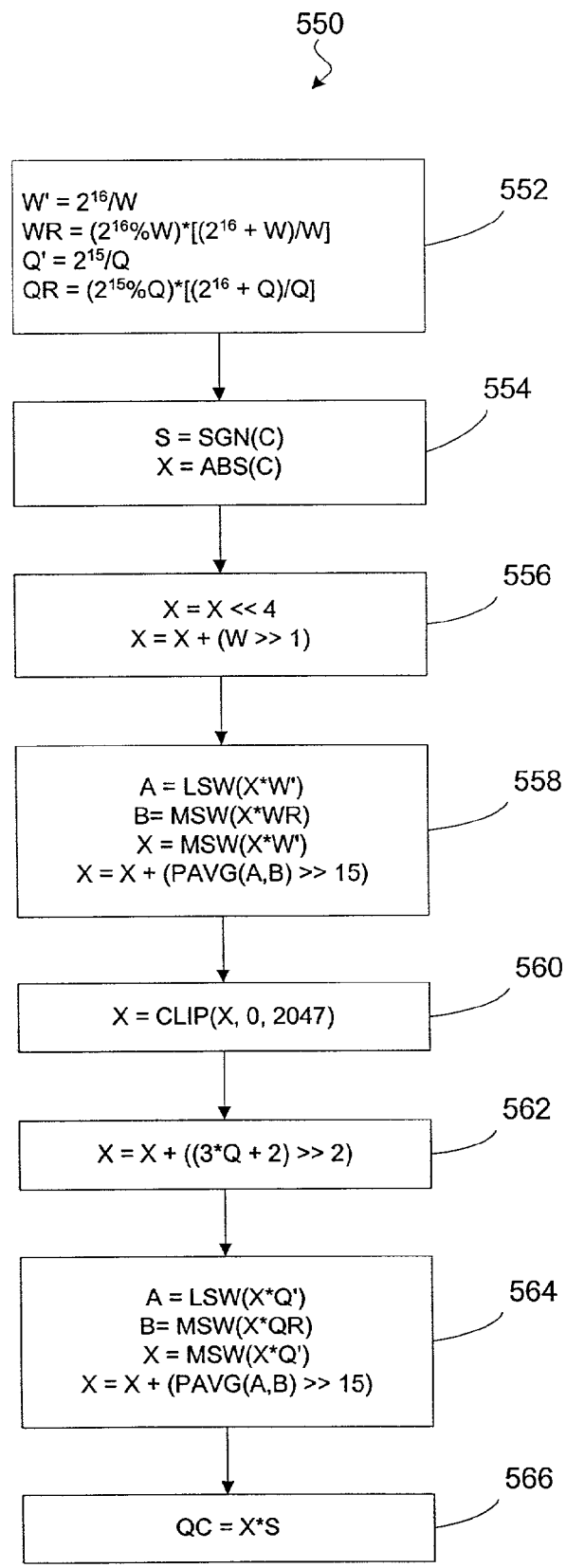
FIGS. 9A and 9B are simplified flow diagrams illustrating methods, according to one embodiment of the present invention, for quantizing DCT coefficients according to the MPEG-4 standard.
Figure 9B:
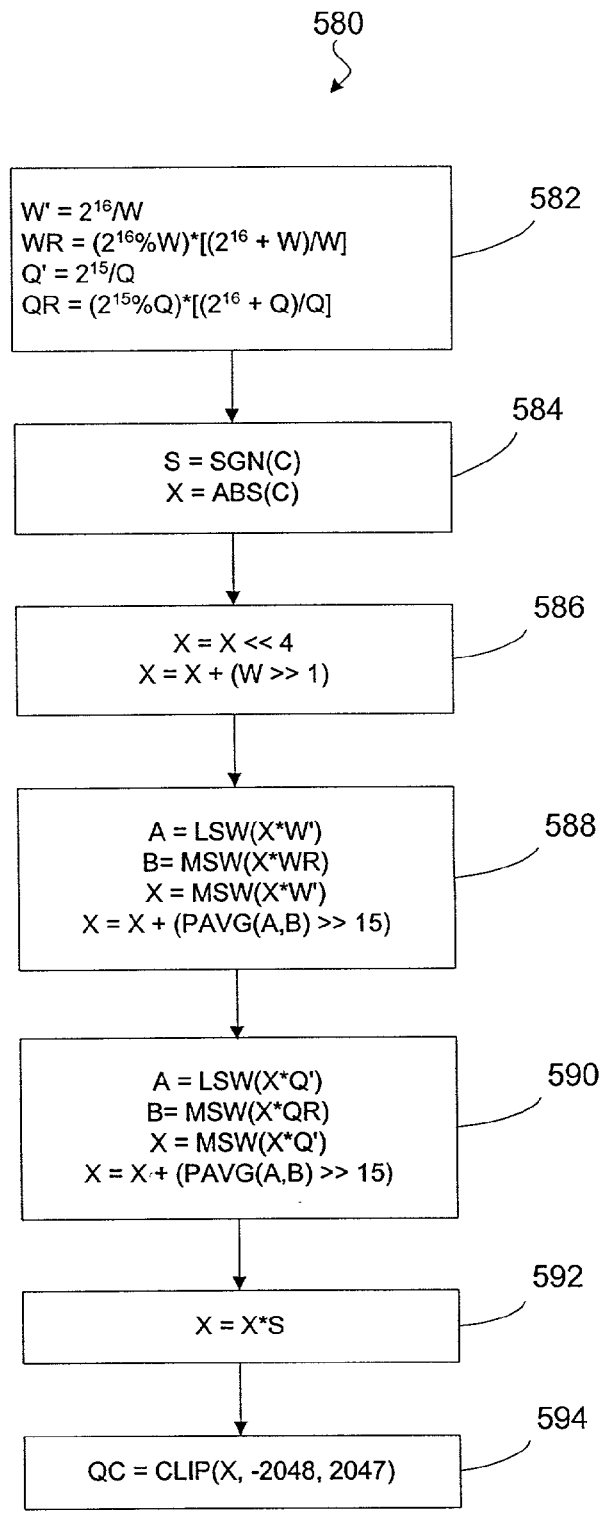

FIGS. 9A and 9B are simplified flow diagrams illustrating one specific embodiment according to the present invention. In particular, FIGS. 9A and 9B illustrate methods that can be implemented using packed integer instructions of an Intel™ microprocessor with MMX™ technology, or the like, and that perform the quantization illustrated in FIGS. 4A and 4B. The method 550 of FIG. 9A corresponds to the implementation illustrated in FIG. 4A, and the method 580 of FIG. 9B corresponds to the implementation illustrated in FIG. 4B.

In FIGS. 9A and 9B, C represents a plurality of packed 16-bit integers corresponding to a plurality of unquantized DCT coefficients. In some embodiments, C can include four packed 16-bit DCT coefficients. In other embodiments, C can include eight packed 16-bit DCT coefficients. Thus, the methods of FIGS. 9A and 9B permit the quantization of multiple DCT coefficients in parallel.

In step 552, the packed integers W', WR, Q' and QR are calculated. The packed integers W' are calculated based on W, which represents a plurality of packed 16-bit integers corresponding to elements of the quantization matrix. In particular, the values in W are the elements of the quantization matrix that correspond to the DCT coefficients in C. The values W' are calculated similarly to the values D' calculated in step 452 of FIG. 8. Additionally, the packed integers WR are calculated similarly to the values R' calculated in step 454 of FIG. 8 (in this particular embodiment, k is selected as two).

Also in step 552, the values Q' and QR are calculated in a similar manner to the values W' and WR, but based on Q. Q represents a plurality of packed 16-bit integers corresponding to the quantization scale. Thus, if each of the DCT coefficients to be quantized in C have the same quantization scale, then each of the packed integers of Q are the same. Unlike W' and WR, the values Q' and QR are computed using the value $2^{15}$/Q. Referring now to FIGS. 4A and 4B, steps 206 and 224 involve dividing by the divisor 2*Q. Thus, the factor of 2 included in the divisor is incorporated in the values Q' and QR by computing them using the value $2^{15}$/Q rather than $2^{16}$/Q.

In step 554, the sign information of each of the DCT coefficients in C is stored via packed integers in a register or memory location S. Also, the absolute value of each of the DCT coefficients in C is stored via packed unsigned integers in a register or memory location X. In step 556, the numerator in step 202 of FIG. 4A is calculated for each of the DCT coefficients.

In step 558, the division by W[i] in step 202 of FIG. 4A is calculated. Particularly, the division is calculated for each of the packed integers of X, similarly to steps 456, 458, 460 and 462 of FIG. 8. Then, in step 560, the results of step 558 are each clipped, corresponding to step 504 of FIG. 4A.

In step 562, the numerator in step 206 of FIG. 4A is calculated for each of the packed integers of X. Then, in step 564, the division by 2*Q in step 206 of FIG. 4A is calculated. Particularly, the division is calculated for each of the packed integers of X, similarly to steps 456, 458, 460 and 462 of FIG. 8. Then, in step 566, the resulting values in X are multiplied by the sign information in S, producing the quantized DCT coefficients packed in the register or memory location Qc.

Note that the method illustrated in FIG. 9A does not include a clipping step similar to that of step 208 of FIG. 4A. It has been found, via experimentation, that for the allowed quantizsation scale values Q and quantization matrix values W in MPEG-4, the values in QC generated by step 566 are greater than or equal to −2048, and less than or equal to 2047. Thus, a clipping step similar to that of step 208 of FIG. 4A is not needed.

FIG. 9B illustrates a particular embodiment of a method for performing the quantization of Non-Intra pictures according to the implementation illustrated in FIG. 4B. Steps 582, 584, 586 and 588 are the same as steps 552, 554, 556 and 558 of FIG. 9A. The results X of step 588 correspond to the numerator of step 224 of FIG. 4b. Then, in step 590, the division by 2*Q in step 224 of FIG. 4B is calculated. Particularly, the division is calculated for each of the packed integers of X, similarly to steps 456, 458, 460 and 462 of FIG. 8. Then, in step 592, the resulting values in X are multiplied by the sign information in S, and the result is clipped in step 594 to produce the quantized DCT coefficients packed in QC.

Quantization According to Other Encoding/Decoding Standards

In other embodiments according to the present invention, quantization according to other commonly used standards may also be implemented.

1. MPEG-1

Figure 10A:
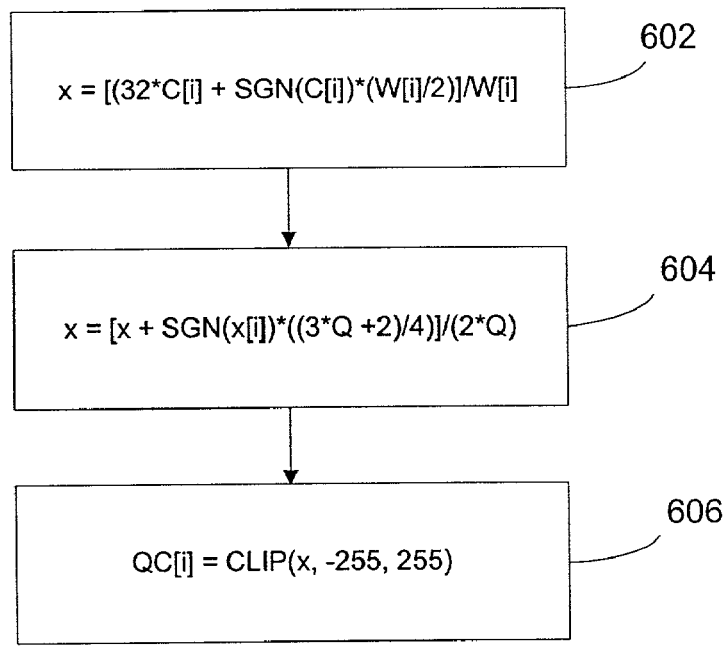
FIGS. 10A and 10B are simplified flow diagrams illustrating methods for quantizing DCT coefficients according to the MPEG-1 standard.
Figure 10B:
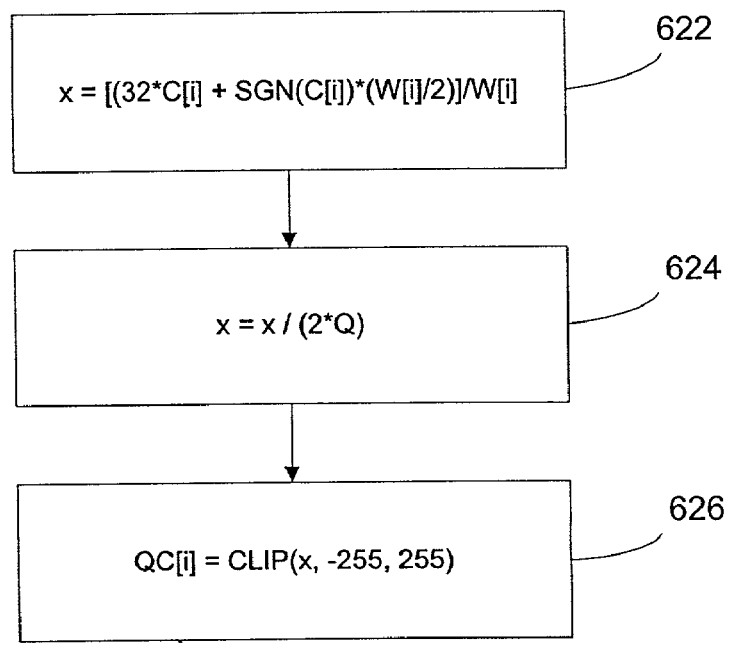

FIGS. 10A and 10B illustrate pseudo code steps for quantizing a block of DCT coefficients according to one typical MPEG-1 implementation. In particular, FIG. 10A illustrates pseudo code steps for quantizing DCT coefficients for an Intra picture, and FIG. 10B illustrates pseudo code steps for quantizing DCT coefficients for a Non-Intra picture. The MPEG-1 quantization implementation illustrated in FIGS. 10A and 10B is similar to the MPEG-4 quantization implementation illustrated in FIGS. 4A and 4B.

Regarding Intra quantization, in step 602, an intermediate value x is generated from the unquantized DCT coefficient C[i] according to the equation shown. Next, in step 604, the value x generated in step 602 is modified according to the equation shown. Finally, in step 606, the quantized coefficient QC[i] is generated by clipping the value x generated in step 604 between the values −255 and +255.

Regarding, Non-Intra quantization, in step 622, an intermediate value x is generated from the unquantized DCT coefficient C[i] according to the same equation described with respect to step 602 of FIG. 10A. Then, in step 624, the value x is divided by the value 2*Q. Finally, in step 626, the quantized coefficient QC[i] is generated by clipping the value x generated in step 624.

Figure 11A:
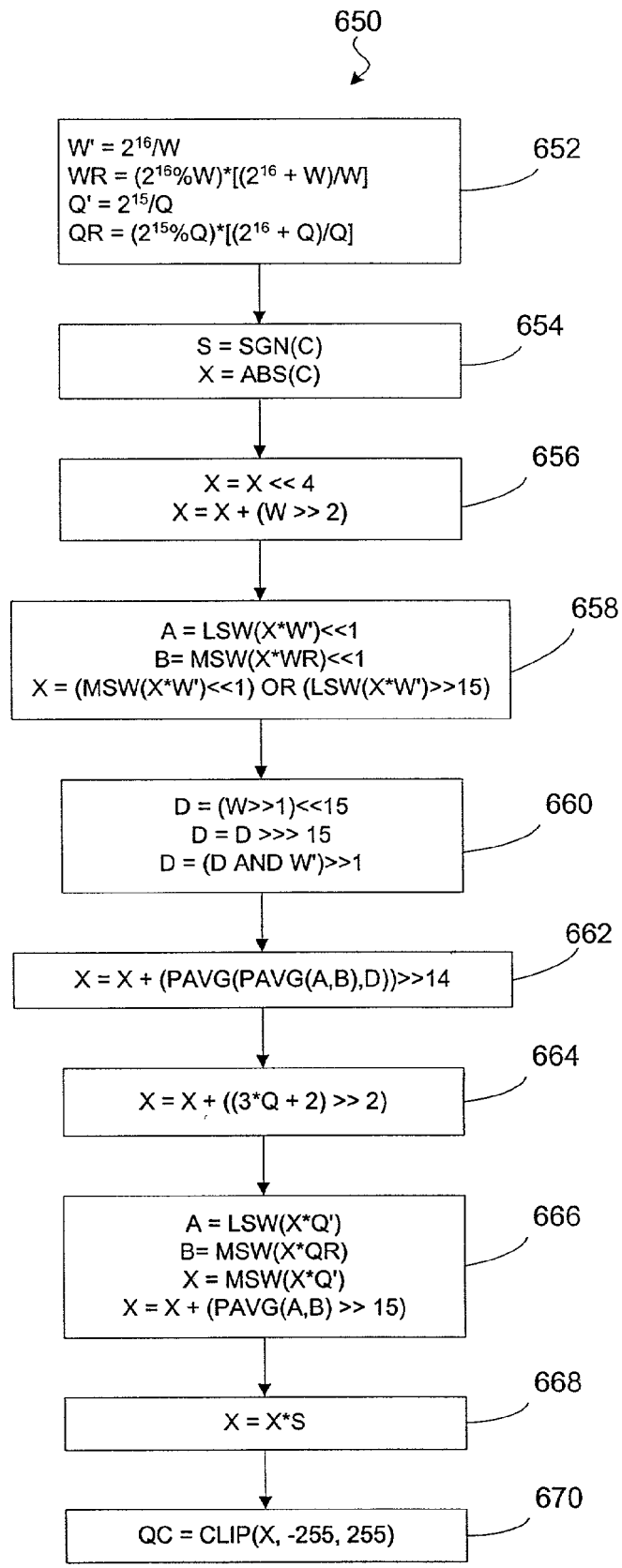
FIGS. 11A and 11B are simplified flow diagrams illustrating methods, according to one embodiment of the present invention, for quantizing DCT coefficients according to the MPEG-1 standard.
Figure 11B:
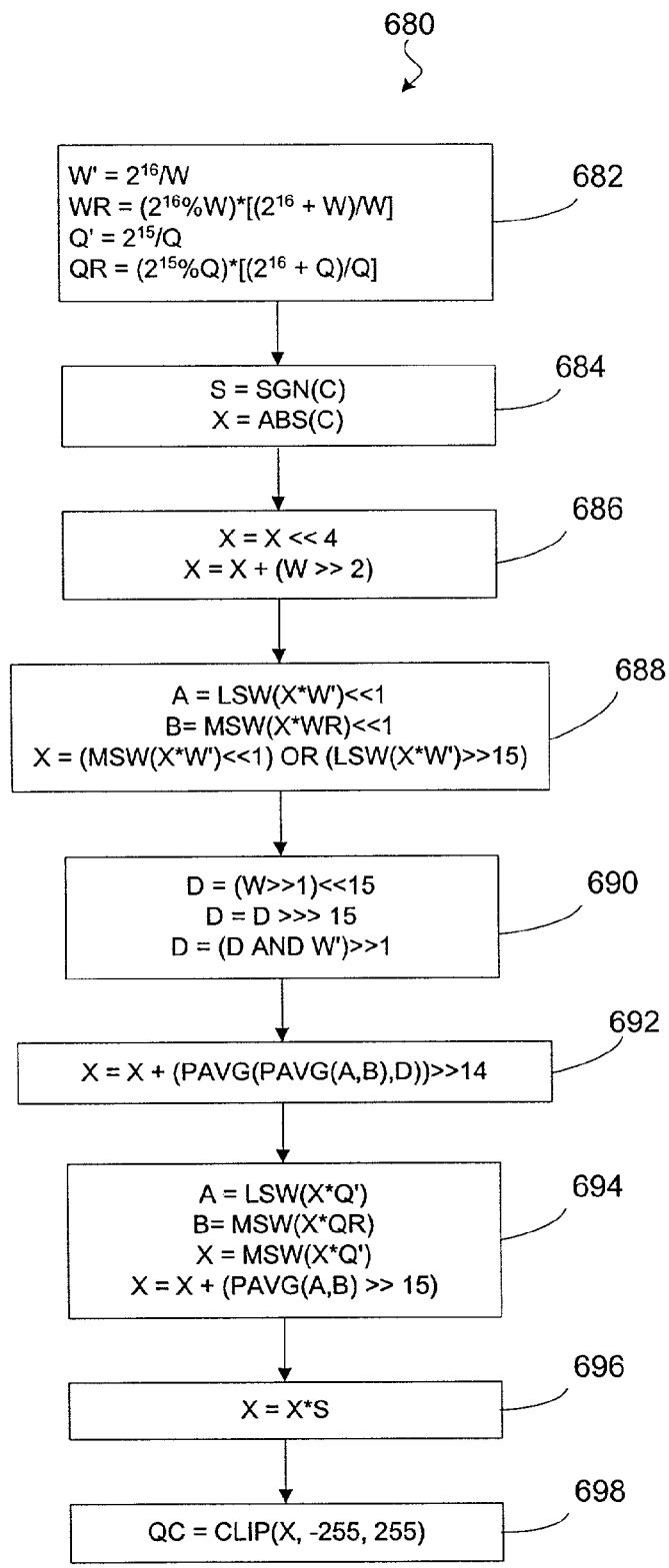

FIGS. 11A and 11B are simplified flow diagrams illustrating one specific embodiment according to the present invention. In particular, FIGS. 11A and 11B illustrate embodiments that can be implemented using packed integer instructions of an Intel™ microprocessor with MMX™ technology, or the like, and that perform the quantization illustrated in FIGS. 10A and 10B. The method 650 of FIG. 11A corresponds to the implementation illustrated in FIG. 10A, and the method 680 of FIG. 11B corresponds to the implementation illustrated in FIG. 10B. FIGS. 11A and 11B will be described with reference to FIGS. 10A and 10B.

In FIGS. 11A and 11B, C represents a plurality of packed 16-bit integers corresponding to a plurality of unquantized DCT coefficients. In some embodiments, C can include four packed 16-bit DCT coefficients. In other embodiments, C can include eight packed 16-bit DCT coefficients.

Referring now to FIG. 11A (Intra quantization), in step 652, the packed integers W', WR, Q' and QR are calculated, as described with respect to step 552 of FIG. 9A. In step 654, the sign information of each of the DCT coefficients in C is stored via packed integers in a register or memory location S. Also, the absolute value of each of the DCT coefficients in C is stored via packed unsigned integers in a register or memory location X.

Referring again to FIG. 10A, it has been found that calculation of the dividend in the equation of step 602 (i.e., 32*C[i]+SGN(C[i])*(W[i]/2)) may cause an overflow for certain values of DCT coefficients. Particularly, C[i] may be in the ranger [−2048, +2047], and thus 32*C[i] can exceed 16 bits. Therefore, in the particular embodiment of FIG. 11A, one half of the dividend is calculated (i.e., 16*C[i]+SGN(C[i])*(W[i]/4)) to avoid an overflow, and, if effect, the result of the division is multiplied by two to compensate. For instance, in step 656, the values 16*X +(W/4) are calculated. And, in step 658, the values A, B and X are calculated, which are similar to the corresponding values calculated in step 558 of FIG. 9A, but multiplied by two. The values X generated in step 658 correspond to the result of step 602 of FIG. 10A.

In step 660, packed values D are calculated (the symbol ">>>15" refers to an arithmetic right-shift by 15 bits). In effect, each packed value in D generated in step 660 is zero if the corresponding quantization matrix element, W[i], right-shifted one bit is even. Otherwise, if the corresponding quantization matrix element, W[i], right-shifted one bit is odd, the packed value in D is equal to the corresponding value $2^{16}$/W[i]>>1 (or ($2^{16}$/W[i])/2).

Then, in step 662, a correction based on the values A, B and D is added to the approximation X. Thus, the values X generated in step 662 corresponds to the value x generated in step 602 of FIG. 10A. Next, in steps 664, 666, and 668, quantized DCT coefficients are calculated as described with respect to steps 562, 564 and 566 in FIG. 9A. Finally, in step 670, the quantized DCT coefficients are clipped between the values of −255 and +255.

Referring now to FIG. 11B (Non-Intra quantization), steps 682, 684, 686, 688, 680 and 692 are the same as steps 652, 654, 656, 658, 660 and 662 of FIG. 11A. The values X generated in step 692 correspond to the dividend of step 624 of FIG. 10B. Steps 694, 696 and 698 are the same as steps 666, 668 and 670 of FIG. 11A.

2. MPEG-2

Figure 12A:
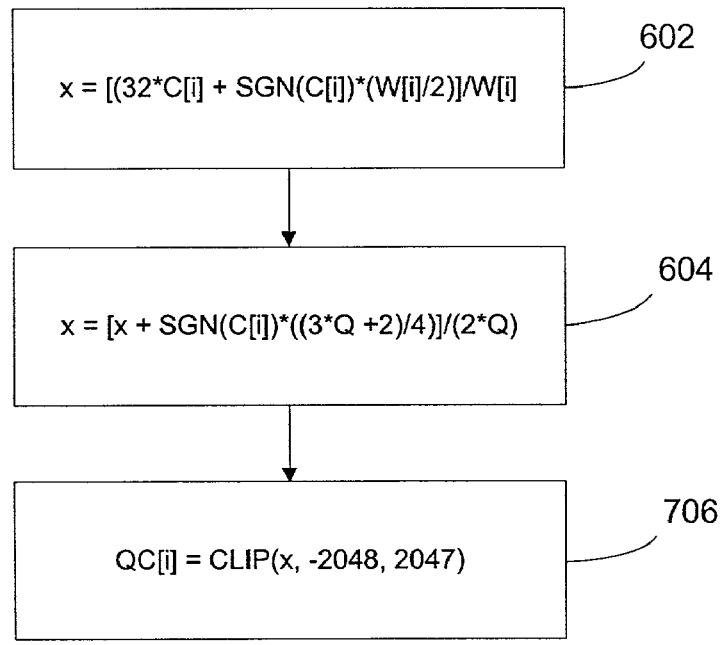
FIGS. 12A and 12B are simplified flow diagrams illustrating methods for quantizing DCT coefficients according to the MPEG-2 standard.
Figure 12B:
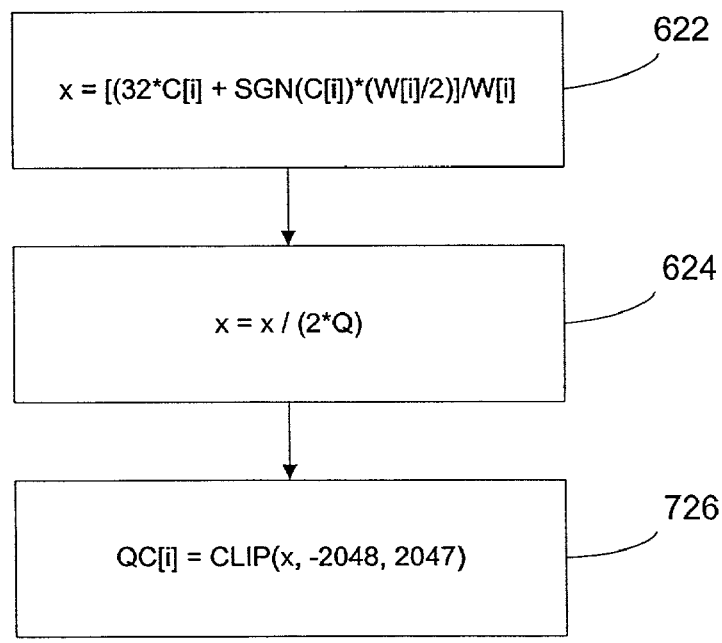

FIGS. 12A and 12B illustrate pseudo code steps for quantizing a block of DCT coefficients according to one typical MPEG-2 implementation. In particular, FIG. 12A illustrates pseudo code steps for quantizing DCT coefficients for an Intra picture, and FIG. 12B illustrates pseudo code steps for quantizing DCT coefficients for a Non-Intra picture. The MPEG-2 quantization implementation illustrated in FIGS. 12A and 12B is the same as the MPEG-1 quantization implementation illustrated in FIGS. 10A and 10B, except that the quantized DCT coefficients are clipped to a different range of values. Thus, the steps that are the same between FIGS. 10A and 12A and FIGS. 10B and 12B have the same reference numbers. Step 706 of FIG. 12A, differs from step 606 of FIG. 10A in that the value x is clipped within the range of −2048 to +2047 rather than between −255 and +255. Similarly, step 726 of FIG. 12B, differs from step 626 of FIG. 10B in that the value x is clipped within the range of −2048 to +2047 rather than between −255 and +255.

Figure 13A:
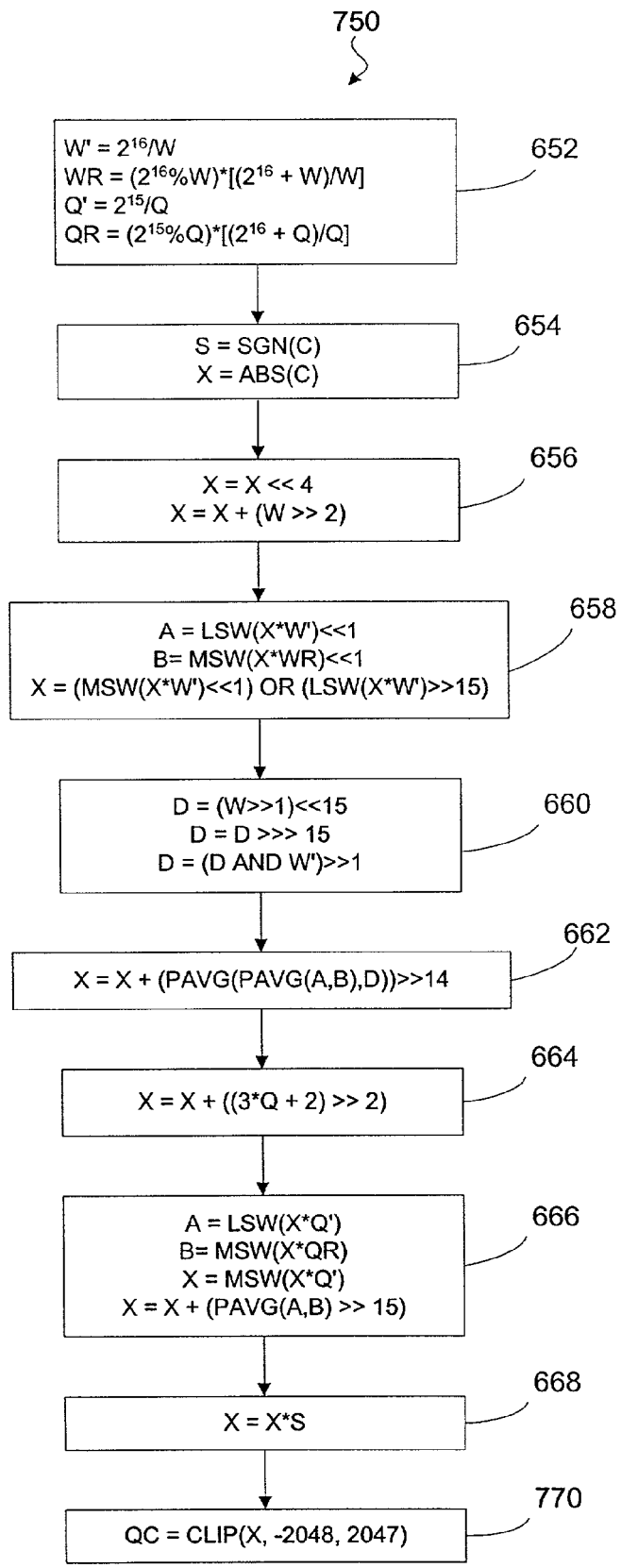
FIGS. 13A and 13B are simplified flow diagrams illustrating methods, according to one embodiment of the present invention, for quantizing DCT coefficients according to the MPEG-2 standard.
Figure 13B:
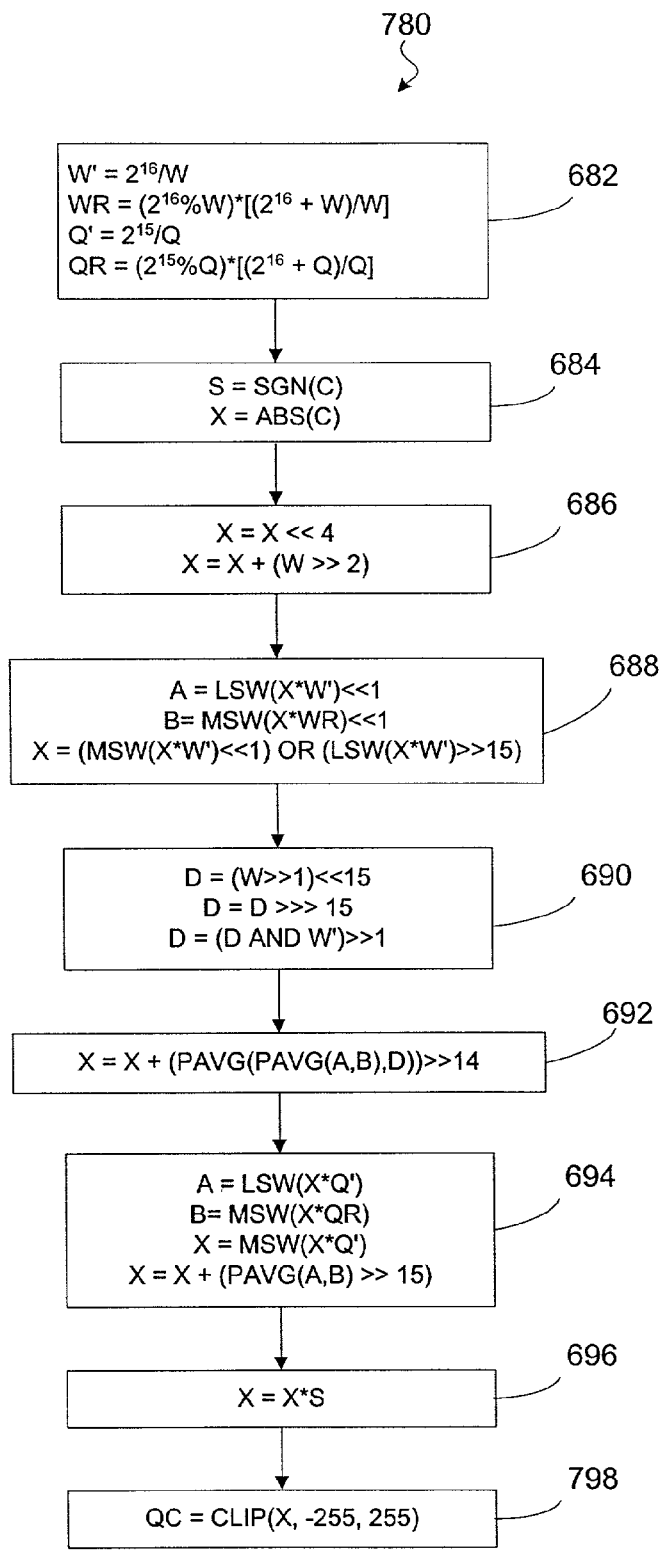

FIGS. 13A and 13B are simplified flow diagrams illustrating one specific embodiment according to the present invention. In particular, FIGS. 13A and 13B illustrate embodiments that can be implemented using packed integer instructions of an Intel™ microprocessor with MMX™ technology, or the like, and that perform the quantization illustrated in FIGS. 12A and 12B. The method 750 of FIG. 13A corresponds to the implementation illustrated in FIG. 12A, and the method 780 of FIG. 13B corresponds to the implementation illustrated in FIG. 12B.

The embodiments illustrated in FIGS. 13A and 13B are the same as the embodiments illustrated in FIGS. 11A and 11B, except that the quantized DCT coefficients are clipped to a different range of values. Thus, the steps that are the same between FIGS. 11A and 13A and FIGS. 11B and 13B have the same reference numbers. Step 770 of FIG. 13A, differs from step 670 of FIG. 11A in that the values X are clipped within the range of −2048 to +2047 rather than between −255 and +255. Similarly, step 798 of FIG. 13B, differs from step 698 of FIG. 11B in that the values X are clipped within the range of −2048 to +2047 rather than between −255 and +255.

3. H.263

Figure 14A:
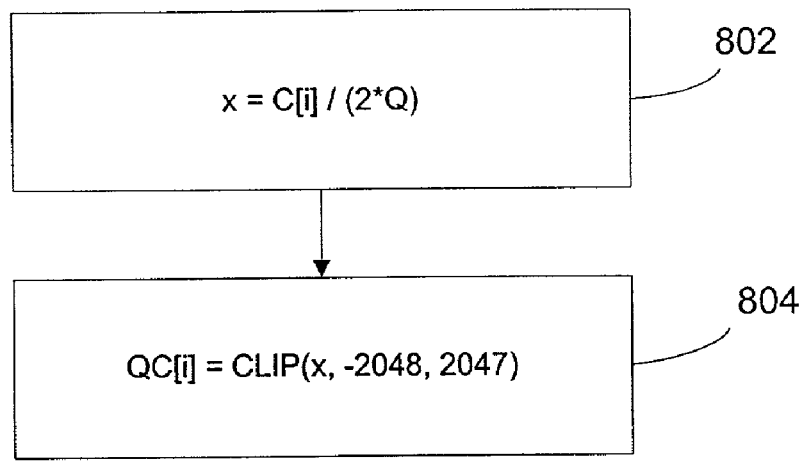
FIGS. 14A and 14B are simplified flow diagrams illustrating methods for quantizing DCT coefficients according to the H.263 standard.
Figure 14B:
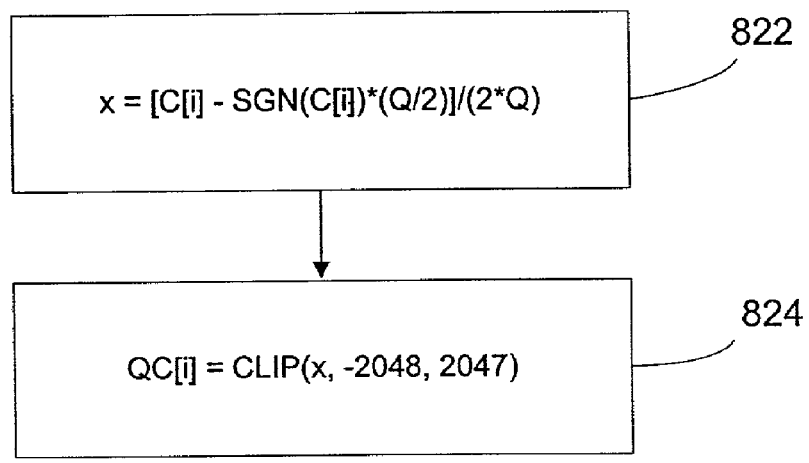

FIGS. 14A and 14B illustrate pseudo code steps for quantizing a block of DCT coefficients according to one typical H.263 implementation. In particular, FIG. 14A illustrates pseudo code steps for quantizing DCT coefficients for an Intra picture, and FIG. 14B illustrates pseudo code steps for quantizing DCT coefficients for a Non-Intra picture.

Regarding Intra quantization (FIG. 14A), in step 802, an intermediate value x is generated from the unquantized DCT coefficient C[i] according to the equation shown. Next, in step 804, the quantized coefficient QC[i] is generated by clipping the value x generated in step 802 between the values −2048 and +2047.

Regarding Non-Intra quantization (FIG. 14B), in step 822, an intermediate value x is generated from the unquantized DCT coefficient C[i] according to the equation shown. Next, in step 824, the quantized coefficient QC[i] is generated by clipping the value x generated in step 822 between the values −2048 and +2047.

Figure 15A:
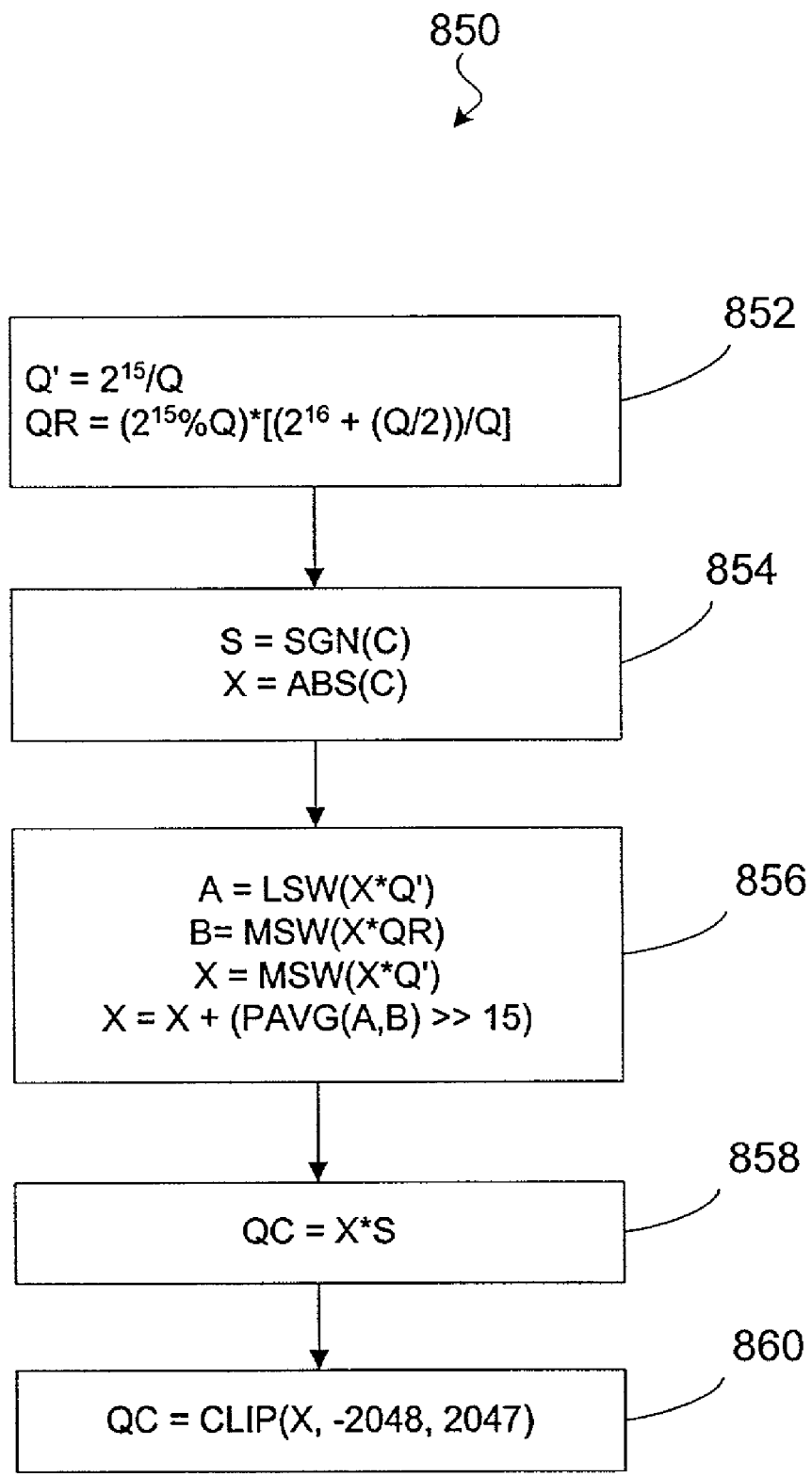
FIGS. 15A and 15B are simplified flow diagrams illustrating methods, according to one embodiment of the present invention, for quantizing DCT coefficients according to the H.263 standard.
Figure 15B:
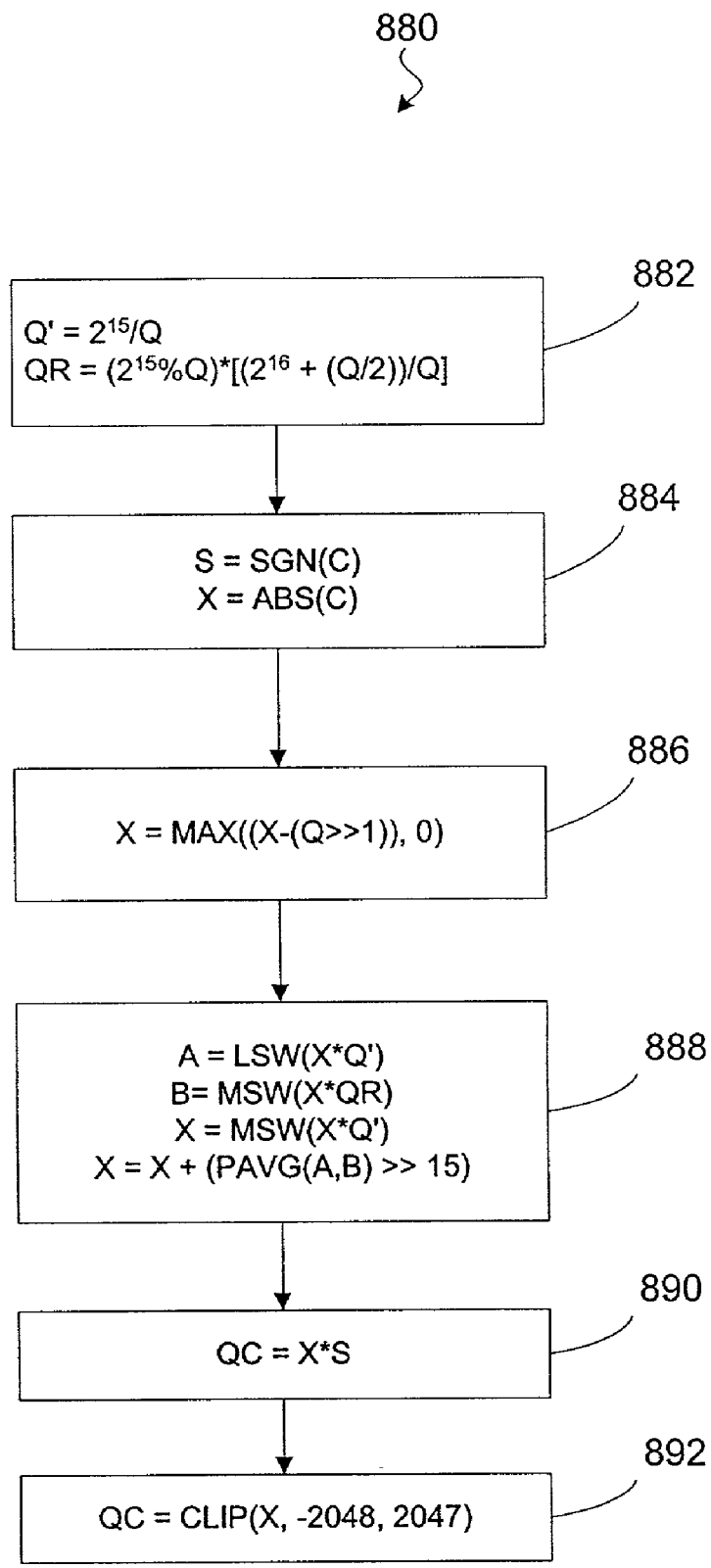

FIGS. 15A and 15B are simplified flow diagrams illustrating one specific embodiment according to the present invention. In particular, FIGS. 15A and 15B illustrate methods that can be implemented using packed integer instructions of an Intel™ microprocessor with MMX™ technology, or the like, and that perform the quantization illustrated in FIGS. 14A and 14B. The method 850 of FIG. 15A corresponds to the implementation illustrated in FIG. 14A, and the method 880 of FIG. 15B corresponds to the implementation illustrated in FIG. 14B.

Referring now to FIG. 15A (Intra quantization), in step 852, the packed integers Q' and QR are calculated similarly to the corresponding values calculated in step 552 of FIG. 9A. (see also step 454 of FIG. 8; in this particular embodiment, k is selected as one). In step 854, the sign information of each of the DCT coefficients in C is stored via packed integers in a register or memory location S. Also, the absolute value of each of the DCT coefficients in C is stored via packed unsigned integers in a register or memory location X.

Then, in step 856, the division by 2*Q in step 802 of FIG. 14A is calculated. Particularly, the division is calculated for each of the packed integers of X, similarly to steps 456, 458, 460 and 462 of FIG. 8. Then, in step 858, the resulting values in X are multiplied by the sign information in S. Finally, in step 860, the DCT coefficients are generated by clipping the values X in the range −2048 to +2047, inclusive.

FIG. 15B illustrates a particular embodiment of a method for performing the quantization of Non-Intra pictures according to the implementation illustrated in FIG. 14B. Steps 882 and 884 are the same as steps 852 and 554, respectively, of FIG. 15A. Then, in step 886, the values X are set to the maximum of X−(Q/2) and zero. The value X generated by step 886 can be implemented, for example, using the PSUBUSW (subtract unsigned saturated word) instruction of Intel™ microprocessors with MMX™ technology, or the like. The results X of step 886 correspond to the numerator of step 822 of FIG. 14B.

Then, in step 888, the division by 2*Q in step 822 of FIG. 14B is calculated. Particularly, the division is calculated for each of the packed integers of X, similarly to steps 456, 458, 460 and 462 of FIG. 8. Next, in step 890, the resulting values in X are multiplied by the sign information in S, and the result is clipped in step 892 to produce the quantized DCT coefficients packed in QC.

4. DCT Coefficient Prediction

In some video encoding/decoding implementations, quantized DCT coefficients may be predicted based on quantized DCT coefficients from another block. Then, the difference between the predicted coefficient and the actual coefficient are transmitted. In such implementations, DCT coefficients can be quantized according to the equation:

$$QC[i]=[C[i]+SGN(C[i])*(Q/2)]/Q. \quad (3)$$

Figure 16:
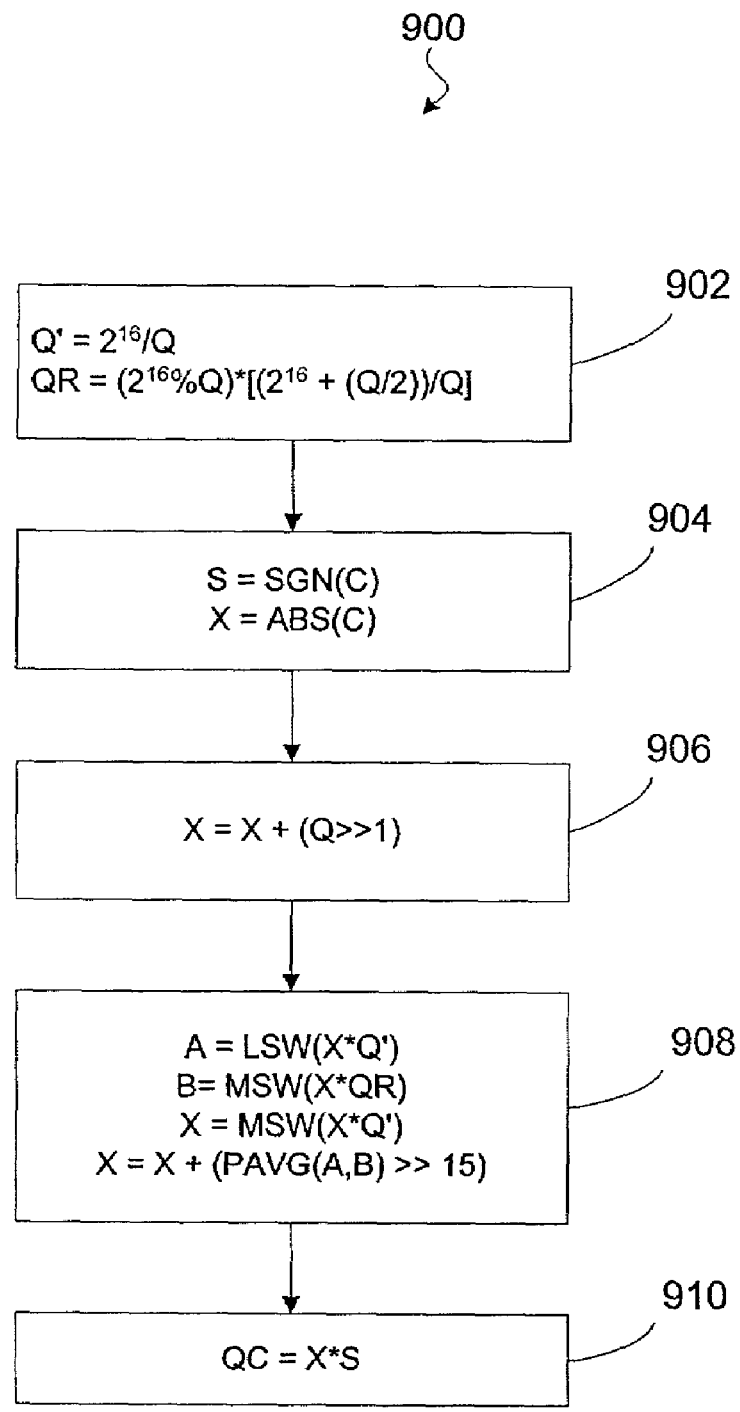
FIG. 16 is simplified flow diagrams illustrating a method for quantizing DCT coefficients according to an other embodiment of the present invention.

FIG. 16 is a simplified flow diagram illustrating one specific embodiment according to the present invention. In particular, FIG. 16 illustrates a method 900 that can be implemented using packed integer instructions of an Intel™ microprocessor with MMX™ technology, or the like, and that perform the quantization of equation (3).

In step 902, the packed integers Q' and QR are calculated similarly to step 454 of FIG. 8 (in this particular embodiment, k is selected as one). In step 904, the sign information of each of the DCT coefficients in C is stored via packed integers in a register or memory location S. Also, the absolute value of each of the DCT coefficients in C is stored via packed unsigned integers in a register or memory location X. In step 906, the values Q>>1 are added to the packed values X.

Then, in step 908, the division by Q in equation (3) is calculated. Particularly, the division is calculated for each of the packed integers of X, similarly to steps 456, 458, 460 and 462 of FIG. 8. Then, in step 910, the resulting values in X are multiplied by the sign information in S to generate the quantized DCT coefficients QC.

5. Q Scaling

As described above, in some video encoding/decoding implementations, quantized DCT coefficients may be predicted based on quantized DCT coefficients from another block. In some instances, the quantization scale of the current block may be different than the quantization scale of the block from which the predictions are based. In such implementations, the predicted quantized DCT coefficients are scaled to account for the different Q values of the blocks. In such implementations, a predicted quantized DCT coefficient can be quantized according to the equations $$C[i]=QC_A[i]*Q_A \quad (4)$$

$$QC_P[i]=[C[i]+SGN(C[i])*(Q_A/2)]/Q_P \quad (5)$$

where $QC_A[i]$ is an actual quantized coefficient in a first block, $Q_A$ is a quantization scale for the first block, $QC_P[i]$ is a predicted quantized coefficient in a second block, and $Q_P$ is a quantization scale for the second block.

Figure 17:
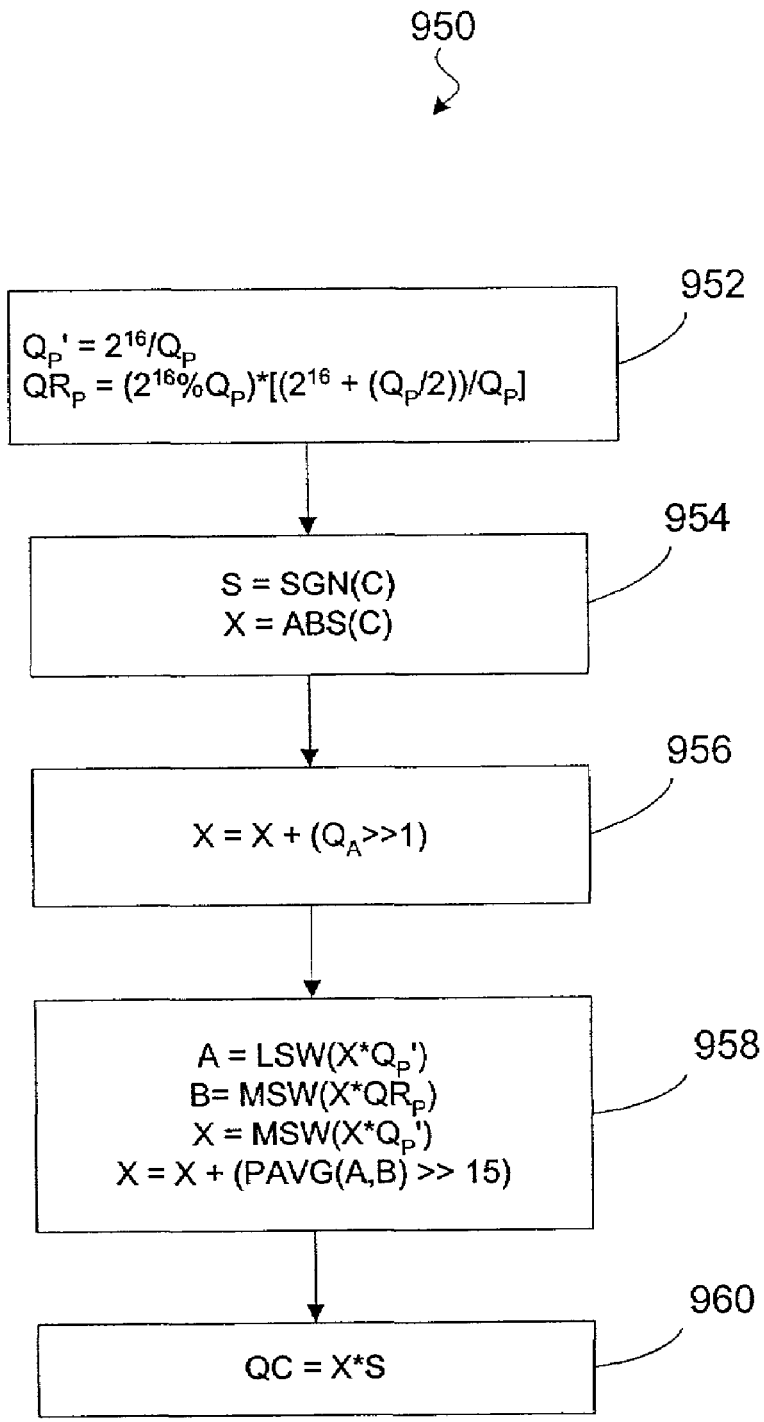
FIG. 17 is simplified flow diagrams illustrating a method for quantizing DCT coefficients according to yet another embodiment of the present invention.

FIG. 17 is a simplified flow diagram illustrating one specific embodiment according to the present invention. In particular, FIG. 17 illustrates a method 950 that can be implemented using packed integer instructions of an Intel™ microprocessor with MMX™ technology, or the like, and that perform the quantization of equation (5).

In step 952, the packed integers $Q_P'$ and $QR_P$ are calculated similarly to step 454 of FIG. 8 (in this particular embodiment, k is selected as one). In step 954, the sign information of each of the packed integers in C is stored via packed integers in a register or memory location S. Also, the absolute value of each of the values in C is stored via packed unsigned integers in a register or memory location X. In step 956, the values $Q_A/2$ are added to the packed values X.

Then, in step 958, the division by $Q_P$ in equation (5) is calculated. Particularly, the division is calculated for each of the packed integers of X, similarly to steps 456, 458, 460 and 462 of FIG. 8. Then, in step 960, the resulting values in X are multiplied by the sign information in S to generate the predicted quantized DCT coefficients $QC_P$.

Variations

In many of the above-described embodiments, a dividend X was modified with a factor based on a divisor D, prior to multiplication by a value D'. For example, in step 556 of FIG. 9A, a value W>>1 is added to the dividend 16*X. Also, for example, in step 562 of FIG. 9A, a value (3*Q+2)>>2 is added to the dividend X. Such modifications of the dividend are included for rounding purposes. It is to be understood that other embodiments may not include such modifications to the dividend, for example, if it is desired to round results toward zero.

In the above description, embodiments of the present invention have been described in the context of pseudo code and with reference to software. It is to be understood that embodiments according to the present invention need not be implemented in software. Some embodiments may be implemented using only hardware, or both hardware and software. Additionally, although typical word lengths have been described that are powers of two (e.g., 8, 16, etc.), other embodiments may employ word lengths that are not a power of two. Also, in some embodiments, tests may be used to determine if the divisor is a one. If so, then the various techniques described above for performing integer division can be skipped because the result of such a division would merely be the dividend itself. Similarly, tests may be used to determine if the divisor is a power of two. If so, then the various techniques described above for performing integer division can be skipped because the result of such a division would merely be a right-shift of the dividend by a corresponding number of bits.

Further, although embodiments according to the present invention were described in the context of MPEG encoding and decoding, other embodiments may be used in other contexts. For example, some embodiments may be used to quantize image data, audio data, seismic data, communications data (e.g., satellite, terrestrial, cellular, etc.), etc. Additionally, other embodiments may be used in searching and sorting of data (e.g., sorting data into bins corresponding to data ranges). Also, some embodiments may be employed in general data communication systems.

Moreover, although embodiments according to the present invention were described in the context of integer operations, it is to be understood that other embodiments may similarly provide fixed-point division operations. Also, although some of the computations described above involved an integer operation in which the result is rounded towards zero (i.e., "/"), it is to be understood that in other embodiments, different types of rounding can be employed (e.g., rounding to nearest integer, rounding towards $+\infty$, rounding toward $-\infty$, etc.).

In other embodiments of the present invention, combinations or sub-combinations of the above-disclosed invention can be advantageously made. The block diagrams of the architecture and the steps in the flow diagrams are grouped for ease of understanding. However it should be understood that combinations of blocks, additions of new blocks, re-arrangement of blocks, and the like are contemplated in alternative embodiments of the present invention.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

What is claimed is:

1. A method in a signal processor for quantizing a digital signal, the method comprising:
    generating a fixed-point approximation of a value $X \div D$, wherein X is a fixed-point value based on one or more samples in the digital signal, and wherein D is a fixed-point quantization parameter;
    generating a correction; and
    modifying the approximation with the correction wherein the generating the correction includes multiplying X by DR, wherein DR is $((2^n+k*(D/2))/D)*(2^n \text{ modulo } D)$, wherein k is a non-negative number.

2. The method of claim 1, wherein X is based on a DCT coefficient.

3. The method of claim 2, wherein X is based on an absolute value of the DCT coefficient.

4. The method of claim 2, wherein $X=X'+D>>1$, wherein X' is a fixed-point value based on a Discrete Cosine Transform (DCT) coefficient wherein ">>" symbolizes a right shift, and wherein D is a quantization scale.

5. The method of claim 2, wherein $X=X'+D2>>1$, wherein X' is a fixed-point value based on a DCT coefficient, and wherein D2 is another quantization parameter.

6. The method of claim 2, wherein $D=2*Q$, wherein D' is $2^{n-1}/Q$, wherein DR is $((2^n+k*(Q/2))/Q)*(2^{n-1} \% Q)$, and wherein Q is a quantization scale.

7. The method of claim 6, wherein $X=X'+(3*Q+2)>>2$, wherein X' is a fixed-point value based on a DCT coefficient.

8. The method of claim 6, wherein X is the maximum of zero and the difference of X' and $Q/2$ ($X=\max\{0, X'-Q/2\}$), wherein X' is a fixed-point value based on a DCT coefficient.

9. The method of claim 1, wherein modifying the approximation with the correction includes adding the approximation with the correction.

10. The method of claim 9, wherein n is a word length, wherein the approximation includes a most significant word (MSW(approximation)) and a least significant word (LSW(approximation)), wherein the correction includes a most significant word (MSW(correction)), and wherein adding the approximation with the correction includes:
    adding MSW(correction) with LSW(approximation) to produce a sum;
    right-shifting the sum by n bits; and
    adding the sum with MSW(approximation).

11. The method of claim 10, wherein the signal processor is a microprocessor having an instruction for calculating a function $(A+B+1)>>1$, and wherein the step of adding MSW(correction) with LSW(approximation) and the step of right-shifting the sum by n bits include:
    calculating (MSW(correction)+LSW(approximation)+1>>1) using the instruction; and
    right-shifting (MSW(correction)+LSW(approximation)+1>>1) by n−1 bits.

12. The method of claim 11, wherein the microprocessor is an Intel™ microprocessor with MMX™ technology, and wherein the instruction is a Packed Average Word (pavgw) instruction.

13. A method in a signal processor for quantizing a digital signal, the method comprising:
    generating a fixed-point approximation of a value $X \div D$, wherein X is a fixed-point value based on one or more samples in the digital signal, and wherein D is a fixed-point quantization parameter;
    generating a correction;
    modifying the approximation with the correction; and
    generating X, wherein $X=32* \text{ABS}(X')+\text{SGN}(X')*(D>>1)$, wherein X' is a fixed-point value based on a DCT coefficient, and wherein D is a quantization step.

14. The method of claim 13, wherein generating X includes generating $X''=16*\text{ABS}(X')+\text{SGN}(X')*(D>>2)$.

15. The method of claim 14, wherein n is a word length, and wherein generating the approximation includes:
    multiplying X" by D' to produce a most significant word of $X''*D'$ (MSW($X''*D'$)) and a least significant word of $X''*D'$ (LSW($X''*D'$)), wherein D' is $2^n/D$, wherein n is a positive integer such that $2^n>D$.

16. The method of claim 15, wherein generating the approximation further includes:
- left-shifting MSW(X"*D') by one bit to produce MSW (X"*D')<<1;
- right shifting LSW(X"*D') by 15 bits to produce LSW (X"*D')>>15; and
- bit-wise ORing MSW(X"*D')<<1 with LSW(X"*D') >>15.

17. The method of claim 15, wherein generating the correction includes:
- multiplying X" by DR to produce a most significant word of X"*DR (MSW(X"*DR)), wherein DR is ((2$^n$+k*(D/ 2))/D)y*(2$^n$% D), wherein k is a non-negative number.

18. The method of claim 17, wherein the step of adding the approximation with the correction includes:
- left-shifting LSW(X"*D') by one bit to produce LSW (X"*D')<<1;
- left-shifting MSW(X"*DR) by one bit to produce MSW (X"*DR)<<1;
- adding LSW(X"*D')<<1 with MSW(X"*DR)<<1 to produce a sum;
- right-shifting the sum by n bits; and
- adding the sum with the bit-wise OR of MSW(X"*D')<<1 with LSW(X"*D')>>15.

19. The method of claim 18, further including, prior to the step of right-shifting the sum, adding D' to the sum if D>>1 is odd.

20. The method of claim 19, wherein the signal processor is a microprocessor having an instruction for calculating the function (A+B+1)>>1, and wherein the steps of adding LSW(X"*D')<<1 with MSW(X"*DR)<<1, adding D' to the sum, and right-shifting the sum by n bits include:
- generating sum=(LSW(X"*D')<<1+MSW(X"*DR)<<1+ 1)>>1 using the instruction;
- generating sum=(sum+(D'/2)+1)>>1 using the instruction; and
- right-shifting the sum by n−2 bits.

21. The method of claim 20, wherein the microprocessor is an Intel™ microprocessor with MMX™ technology, and wherein the instruction is the pavgw instruction.

* * * * *